(12) United States Patent
Yang et al.

(10) Patent No.: US 12,037,047 B2
(45) Date of Patent: Jul. 16, 2024

(54) UNDERBODY SHIELD COMPOSITIONS AND ARTICLES THAT PROVIDE ENHANCED PEEL STRENGTH AND METHODS OF USING THEM

(71) Applicants: Yankai Yang, Lynchburg, VA (US); Anthony J Messina, Macomb, MI (US); Mark O. Mason, Covington, VA (US)

(72) Inventors: Yankai Yang, Lynchburg, VA (US); Anthony J Messina, Macomb, MI (US); Mark O. Mason, Covington, VA (US)

(73) Assignee: Hanwha Azdel, Inc., Forest, VA (US)

( * ) Notice: Subject to any disclaimer, the term of this patent is extended or adjusted under 35 U.S.C. 154(b) by 75 days.

(21) Appl. No.: 17/233,616

(22) Filed: Apr. 19, 2021

(65) Prior Publication Data
US 2022/0081044 A1 Mar. 17, 2022

Related U.S. Application Data

(63) Continuation of application No. 15/151,156, filed on May 10, 2016, now Pat. No. 10,981,606.
(Continued)

(51) Int. Cl.
*B32B 7/12* (2006.01)
*B32B 3/26* (2006.01)
(Continued)

(52) U.S. Cl.
CPC ............. *B62D 29/04* (2013.01); *B32B 3/26* (2013.01); *B32B 5/02* (2013.01); *B32B 5/022* (2013.01); *B32B 5/08* (2013.01); *B32B 5/10* (2013.01); *B32B 5/26* (2013.01); *B32B 7/12* (2013.01); *B32B 7/14* (2013.01); *B32B 27/12* (2013.01); *B32B 37/1284* (2013.01); *B32B 38/0036* (2013.01); *B32B 38/164* (2013.01); *B62D 25/20* (2013.01); *B32B 2037/1253* (2013.01);
(Continued)

(58) Field of Classification Search
CPC .......... B32B 2309/105; B32B 2305/72; B32B 2305/08; B32B 2305/022; B32B 2038/0088; B32B 2038/0084; B32B 2037/1253; B32B 38/164; B32B 38/0036; B32B 37/1284
See application file for complete search history.

(56) References Cited

U.S. PATENT DOCUMENTS

| | | | |
|---|---|---|---|
| 6,136,732 A * | 10/2000 | Patel | B05D 1/30 428/355 R |
| 2008/0008869 A1* | 1/2008 | Good | B32B 5/28 264/45.3 |
| 2013/0101822 A1* | 4/2013 | Kunal | B32B 27/34 428/339 |

* cited by examiner

*Primary Examiner* — Vishal I Patel
(74) *Attorney, Agent, or Firm* — Rhodes IP PLC; Christopher R Rhodes

(57) ABSTRACT

A thermoplastic composite article comprising a porous core layer comprising a plurality of reinforcing fibers, a lofting agent and a thermoplastic material is provided. In certain instances, the article further comprises a skin layer disposed on the core layer and an adhesive layer between the core layer and the skin layer. In some configurations, the adhesive layer comprises a thermoplastic polymer and an effective amount of a thermosetting material to provide a post-molding peel strength between the skin layer and the post lofted core layer of at least 0.5 N/cm (in either or both of the machine direction or cross direction) as tested by DIN 53357 A dated Oct. 1, 1982.

20 Claims, 9 Drawing Sheets

Related U.S. Application Data

(60) Provisional application No. 62/160,454, filed on May 12, 2015.

(51) Int. Cl.
    *B32B 5/02*         (2006.01)
    *B32B 5/08*         (2006.01)
    *B32B 5/10*         (2006.01)
    *B32B 5/26*         (2006.01)
    *B32B 7/14*         (2006.01)
    *B32B 27/12*        (2006.01)
    *B32B 37/12*        (2006.01)
    *B32B 38/00*        (2006.01)
    *B62D 25/20*        (2006.01)
    *B62D 29/04*        (2006.01)

(52) U.S. Cl.
CPC ......... *B32B 2038/0084* (2013.01); *B32B 2038/0088* (2013.01); *B32B 2255/02* (2013.01); *B32B 2255/26* (2013.01); *B32B 2260/021* (2013.01); *B32B 2260/023* (2013.01); *B32B 2260/046* (2013.01); *B32B 2262/02* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/12* (2013.01); *B32B 2262/14* (2013.01); *B32B 2266/06* (2013.01); *B32B 2305/022* (2013.01); *B32B 2305/08* (2013.01); *B32B 2305/72* (2013.01); *B32B 2307/50* (2013.01); *B32B 2307/54* (2013.01); *B32B 2309/105* (2013.01); *B32B 2605/08* (2013.01); *B32B 2607/00* (2013.01)

| Scrim Sample | Molded Thickness (mm) | Peel Strength (N/cm), Top Side | | Peel Strength (N/cm), Bottom |
|---|---|---|---|---|
| | | MD | CD | MD |
| Condako Control #1 | 20 | 0.16 | 0.17 | 0.87 |
| Condako Control #2 | 20 | 0.07 | 0.09 | 0.45 |
| Codako Control #3 | 20 | 0.3 | 0.2 | 0.3 |
| Tenowo #1 | 20 | 0.41 | 0.42 | 2.1 |
| Tenowo #2 | 20 | 0.62 | 0.36 | 0.94 |
| Tenowo #3 | 20 | 0.4 | 0.3 | 1.8 |
| Fibertex #1 | 20 | 0.59 | 0.82 | Did not test |
| Fibertex #2 | 20 | 0.51 | 0.37 | 1.87 |
| Fibertex #3 | 20 | 0.4 | 0.4 | 2.6 |

FIG. 16

| Scrim Sample | Molded Thickness (mm) | Peel Strength (N/cm), Top Side | | Peel Strength (N/cm), Bottom | |
|---|---|---|---|---|---|
| | | MD | CD | MD | CD |
| Condako Control | 20 | 0.18 | 0.15 | 0.54 | 0.38 |
| Tenowo | 20 | 0.48<br>170% better than control | 0.36<br>135% better than control | 1.61<br>199% better than control | 1.88<br>394% better than control |
| Fibertex | 20 | 0.5<br>183% better than control | 0.53<br>246% better than control | 2.24<br>314% better than control | 1.87<br>391% better than control |

UNDERBODY SHIELD COMPOSITIONS AND ARTICLES THAT PROVIDE ENHANCED PEEL STRENGTH AND METHODS OF USING THEM

PRIORITY APPLICATION

This application is related to, and claims priority to and the benefit of, U.S. Provisional Application No. 62/160,454 filed on May 12, 2015, the entire disclosure of which is hereby incorporated herein by reference for all purposes.

TECHNOLOGICAL FIELD

This application is related to underbody shield materials that provide enhanced peel strength. More particularly, certain embodiments described herein are directed to underbody shield materials that include a core layer, an adhesive layer on the core layer and a skin layer disposed on the adhesive layer to provide a composite article, in which the composite article comprises a post-processing enhanced peel strength.

BACKGROUND

Articles for automotive and construction materials applications typically are designed to meet a number of competing and stringent performance specifications. Processing of the articles during production can often lead to damage or failure of the articles.

SUMMARY

Certain configurations are described herein that are directed to multi-layer assemblies, and components thereof, that provide an enhanced peel strength between a skin layer and an underlying prepreg or core layer.

In one aspect, an underbody shield composition comprising a thermoplastic core layer comprising a web open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, a skin material disposed on a first surface of the core layer and an adhesive layer disposed between the core layer and the skin material, the adhesive layer comprising a thermoplastic polymer and an effective amount of a thermosetting material to provide a post-molding peel strength between the skin material and the post lofted core layer of at least 0.5 N/cm (in one or both of the machine direction or cross direction) as tested by DIN 53357 A dated Oct. 1, 1982 is provided.

In certain instances, the adhesive layer is present as a non-film adhesive layer. In other configurations, the skin material is selected from the group consisting of a fabric, a scrim, a film and combinations thereof. In some examples, the fiber reinforced polymer core comprises a porosity of greater than 0% to about 95% by volume of the polymer core. In further examples, the skin material comprises a porous non-woven material comprising a basis weight of at least 65 gsm (grams per square meter) and an elongation at break of at least 20%. In some embodiments, the skin material is disposed on an entire planar surface of the polymer core. In other instances, the skin material is disposed as a strip on a surface of the polymer core. In some examples, the underbody shield is constructed and arranged to couple to an undercarriage of an automotive vehicle. In further embodiments, the underbody shield comprises a basis weight of less than about 3000 gsm. In some examples, the fiber reinforced polymer core comprises a porosity between about 20% to about 80% by volume of the core. In certain instances, the fibers dispersed within the polymer resin comprise fibers including a diameter greater than about 5 microns and a length from about 5 mm to about 200 mm. In some examples, the polymer resin is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In other examples, the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain instances, the thermoplastic polymer of the adhesive layer comprises a polyolefin. In some embodiments, the thermosetting material of the adhesive layer is present at less than 50% by weight of the adhesive layer. In certain examples, the thermoset comprises at least one epoxy group is an epoxy adhesive. In other embodiments, the composition further comprises an additional skin material disposed on a second surface of the core layer and a second adhesive layer disposed between the additional skin material and the core layer, the second adhesive layer comprising a thermoplastic polymer and an effective amount of a thermosetting material to provide a peel strength between the additional skin material and the post lofted core layer of at least 0.5 N/cm as tested by DIN 53357 A dated Oct. 1, 1982. In some instances, the thermoplastic polymer of the second adhesive layer comprises a polyolefin. In other examples, the thermosetting material of the second adhesive layer is present at less than 50% by weight of the second adhesive layer. In some embodiments, the thermosetting material of the second adhesive layer comprises an epoxy group or is an epoxy adhesive.

In another aspect, an underbody shield composition comprising a thermoplastic core layer comprising a web open celled structures defined by random crossing over of reinforcing fibers held together by a thermoplastic polymer, the thermoplastic core layer further comprising a non-covalently bonded lofting agent within the open celled structures, the lofting agent comprising a composition material effective to increase a thickness of the core layer upon exposure to heat to provide a post lofted core layer with a thickness at least 50% greater than a pre-loft thickness of the core layer, a scrim disposed on a first surface of the core layer, and an adhesive layer disposed between the core layer and the scrim material, the adhesive layer comprising a blend of a thermoplastic polymer and a thermosetting material, the blend effective to provide a peel strength between the scrim material and the post lofted core layer of at least 0.5 N/cm (in one or both of the machine direction or cross direction) as tested by DIN 53357 A dated Oct. 1, 1982 is described.

In certain examples, the adhesive layer is present as a non-film adhesive layer. In other examples, the composition further comprises a skin material disposed on the scrim. In some instances, the fiber reinforced polymer core comprises a porosity of greater than 0% to about 95% by volume of the polymer core. In other embodiments, the scrim comprises a porous non-woven material comprising a basis weight of at least 65 gsm and an elongation at break of at least 20%. In some examples, the scrim is disposed on an entire planar surface of the polymer core. In other embodiments, the scrim is disposed as a strip on a surface of the polymer core. In some examples, the underbody shield is constructed and arranged to couple to an undercarriage of an automotive vehicle. In certain embodiments, the underbody shield comprises a basis weight of less than about 3000 gsm. In other examples, the fiber reinforced polymer core comprises a porosity between about 20% to about 80% by volume of the core. In some embodiments, the fibers dispersed within the polymer resin comprise fibers including a diameter greater than about 5 microns and a length from about 5 mm to about 200 mm. In certain instances, the polymer resin is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In some embodiments, the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain examples, the thermoplastic polymer of the blend comprises a polyolefin. In some embodiments, the thermosetting material of the blend is present at less than 50% by weight of the adhesive layer. In other examples, the thermosetting material comprises an epoxy group or is an epoxy adhesive. In certain instances, the composition comprises a skin material disposed on a second surface of the core layer and a second adhesive layer disposed between the skin material and the core layer, the second adhesive layer comprising a blend of a thermoplastic polymer and a thermosetting material, the second adhesive layer effective to provide a peel strength between the skin material and the post lofted core layer of at least 0.5 N/cm as tested by DIN 53357 A dated Oct. 1, 1982. In some examples, the thermoplastic polymer of the second adhesive layer comprises a polyolefin. In some embodiments, the thermosetting material of the second adhesive layer is present at less than 50% by weight of the second adhesive layer. In certain instances, the thermosetting material of the second adhesive layer comprises an epoxy group or is an epoxy adhesive.

In an additional aspect, a prepreg comprising a first layer comprising a thermoplastic polymer, reinforcing fibers and a lofting agent, the first layer effective to form a core layer comprising a web of open cell structures upon curing of the first layer, wherein the web of open cell structures is defined by random crossing over of the reinforcing fibers held together by the thermoplastic polymer with the lofting agent trapped in the open cell structures of the web, wherein the lofting agent is effective to increase a thickness of the core layer after exposure to heat to provide a post-lofted core layer, an adhesive layer disposed on the first layer, the adhesive layer comprising a blend of a thermoplastic polymer and a thermosetting material, and a skin material disposed on the adhesive layer, in which the adhesive layer is effective to provide a peel strength between the skin material and the post-lofted core layer of at least 0.5 N/cm (in one or both of the machine direction or cross direction) as tested by DIN 53357 A dated Oct. 1, 1982 is described.

In some configurations, the adhesive layer is present as a non-film adhesive layer. In other instances, the skin material is selected from the group consisting of a fabric, a scrim, a film and combinations thereof. In certain embodiments, the fiber reinforced polymer core comprises a porosity of greater than 0% to about 95% by volume of the polymer core. In other embodiments, the skin material comprises a porous non-woven material comprising a basis weight of at least 65 gsm and an elongation at break of at least 20%. In certain examples, the skin material is disposed on an entire planar surface of the polymer core. In other examples, the skin material is disposed as a strip on a surface of the polymer core. In some instances, the prepreg comprises at least one aperture constructed and arranged to permit removable coupling of an underbody shield formed from the prepreg to an undercarriage of an automotive vehicle. In certain embodiments, the prepreg comprises a basis weight of less than about 3000 gsm. In some examples, the fiber reinforced polymer core comprises a porosity between about 20% to about 80% by volume of the core. In certain instances, the fibers dispersed within the polymer resin comprise fibers including a diameter greater than about 5 microns and a length from about 5 mm to about 200 mm. In other embodiments, the polymer resin is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In certain examples, the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In other examples, the thermoplastic polymer of the adhesive layer comprises a polyolefin. In some embodiments, the thermosetting material of the adhesive layer is present at less than 50% by weight of the adhesive layer. In further examples, the thermosetting material comprises an epoxy group or is an epoxy adhesive. In some embodiments, the prepreg comprises an additional skin material disposed on a second surface of the core layer and a second adhesive layer disposed between the additional skin material and the core layer, the second adhesive layer comprising a thermoplastic polymer and an effective amount of a thermosetting material to provide a peel strength between the additional skin material and the post lofted core layer of at least 0.5 N/cm as tested by DIN 53357 A dated Oct. 1, 1982. In other embodiments, the thermoplastic polymer of the second adhesive layer comprises a polyolefin. In some instances, the thermosetting material of the second adhesive layer is present at less than 50% by weight of the second adhesive layer. In further embodiments, the thermosetting material of the second adhesive layer comprises an epoxy group or is an epoxy adhesive.

In another aspect, a method of forming a composite prepreg comprising combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a web comprising the thermoplastic polymer, the reinforcing fibers and the lofting agent, heating the web above a softening temperature of the thermoplastic polymer of the web, disposing an adhesive layer comprising a thermoplastic polymer and a thermosetting material on the heated web, and disposing a skin material on the disposed adhesive layer to provide a composite prepreg is disclosed.

In certain embodiments, the method comprises compressing the composite prepreg to a predetermined thickness to form a composite article. In other embodiments, the method comprises lofting the composite article to increase the thickness of the composite article. In some instances, the method comprises crosslinking the thermosetting material of the adhesive layer to provide a peel strength for the skin material of the lofted composite article of at least 0.5 N/cm as tested by DIN 53357 A dated Oct. 1, 1982. In other examples, the method comprises disposing the adhesive layer by co-spraying the thermoplastic polymer of the adhesive layer and the thermosetting material of the adhesive layer onto the heated web. In some instances, the method comprises crosslinking the thermosetting material of the co-sprayed adhesive layer to provide a peel strength for the skin material of the lofted composite article of at least 0.5 N/cm as tested by DIN 53357 A dated Oct. 1, 1982. In certain embodiments, the method comprises blending the thermoplastic polymer of the adhesive layer and the thermosetting material of the adhesive layer prior to disposing the adhesive layer on the heated web. In some instances, the method comprises crosslinking the disposed adhesive layer comprising the adhesive blend to provide a peel strength for the skin material of the lofted composite article of at least 0.5 N/cm as tested by DIN 53357 A dated Oct. 1, 1982. In certain examples, the method comprises rolling the adhesive blend onto the heated web to provide the adhesive layer. In other examples, the method comprises crosslinking the rolled, adhesive blend to provide a peel strength for the skin material of the lofted composite article of at least 0.5 N/cm as tested by DIN 53357 A dated Oct. 1, 1982.

In an additional aspect, a method of forming a composite article comprising combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a core layer comprising a web formed from the thermoplastic polymer, the reinforcing fibers and the lofting agent, heating the core layer above a softening temperature of the thermoplastic polymer of the core layer, disposing an adhesive layer comprising a thermoplastic polymer and a thermosetting material on the core layer, disposing a skin material on the disposed adhesive layer to provide a composite article, and lofting the core layer of the composite article using heat to increase a thickness of the core layer and provide a peel strength between the disposed skin material and the lofted core layer of at least 0.5 N/cm (in one or both of the machine direction or cross direction) as tested by DIN 53357 A dated Oct. 1, 1982 is provided.

In some examples, the method comprises compressing the composite article to a predetermined thickness prior to lofting of the core layer. In other examples, the method comprises crosslinking the thermosetting material of the adhesive layer. In certain instances, the method comprises disposing the adhesive layer by co-spraying the thermoplastic polymer of the adhesive layer and the thermosetting material of the adhesive layer onto the heated web. In further instances, the method comprises crosslinking the thermosetting material of the co-sprayed adhesive layer. In some examples, the method comprises blending the thermoplastic polymer of the adhesive layer and the thermosetting material of the adhesive layer prior to disposing the adhesive layer on the core layer. In certain instances, the method comprises crosslinking the disposed adhesive layer comprising the adhesive blend. In other examples, the method comprises rolling the adhesive blend onto the core layer to provide the adhesive layer. In some instances, the method comprises crosslinking the adhesive blend of the rolled adhesive layer. In other instances, the method comprises disposing a second adhesive layer on a second surface of the core layer, and disposing a second skin material on the disposed second adhesive layer.

In another aspect, a method of forming a composite article comprising combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a web comprising the thermoplastic polymer, the reinforcing fibers and the lofting agent, heating the web above a softening temperature of the thermoplastic polymer of the web, disposing an adhesive layer comprising a thermoplastic polymer and a thermosetting material on a first surface of the heated web, and disposing a scrim on the disposed adhesive layer to provide a composite article is described.

In certain embodiments, the method comprises compressing the composite prepreg to a predetermined thickness to form the composite article. In other examples, the method comprises lofting the composite article to increase the thickness of the composite article. In further embodiments, the method comprises crosslinking the thermosetting material of the adhesive layer to provide a peel strength for the scrim of the lofted composite article of at least 0.5N/cm as tested by DIN 53357 A dated Oct. 1, 1982. In some instances, the method comprises disposing the adhesive layer by co-spraying the thermoplastic polymer of the adhesive layer and the thermosetting material of the adhesive layer onto the heated web. In certain examples, the method comprises crosslinking the thermosetting material of the co-sprayed adhesive layer to provide a peel strength for the scrim of the lofted composite article of at least 0.5 N/cm as tested by DIN 53357 A dated Oct. 1, 1982. In some embodiments, the method comprises blending the thermoplastic polymer of the adhesive layer and the thermosetting material of the adhesive layer prior to disposing the adhesive layer on the heated web. In other instances, the method comprises crosslinking the disposed adhesive layer comprising the adhesive blend to provide a peel strength for the scrim of the lofted composite article of at least 0.5 N/cm as tested by DIN 53357 A dated Oct. 1, 1982. In some examples, the method comprises rolling the adhesive blend onto the heated web to provide the adhesive layer. In other examples, the method comprises crosslinking the rolled, adhesive blend to provide a peel strength for the scrim of the lofted composite article of at least 0.5 N/cm as tested by DIN 53357 A dated Oct. 1, 1982.

In an additional aspect, a method of reducing road noise in an automotive vehicle, the method comprising providing an underbody shield comprising a thermoplastic core layer comprising a web open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, a skin material disposed on a first surface of the core layer, and an adhesive layer disposed between the core layer and the skin material, the adhesive layer comprising a thermoplastic polymer and an effective amount of a thermosetting material to provide a peel strength between the skin material and the post lofted core layer of at least 0.5 N/cm (in one or both of the machine direction or cross direction) as tested by DIN 53357 A dated Oct. 1, 1982 is provided.

In certain instances, the method comprises providing instructions for molding the underbody shield. In other instances, the method comprises providing instructions for lofting the core layer of the underbody shield. In some embodiments, the method comprises providing at least one fastener configured to couple the underbody shield to the automotive vehicle. In some examples, the method comprises providing instructions for attaching the underbody shield to the automotive vehicle.

In another aspect, a method of reducing road noise in an automotive vehicle, the method comprising providing a prepreg comprising a first layer comprising a thermoplastic polymer, reinforcing fibers and a lofting agent, the first layer effective to form a web of open cell structures upon curing of the first layer, wherein the web open celled structures is defined by random crossing over of the reinforcing fibers held together by the thermoplastic polymer with the lofting agent trapped in the open cell structures of the web, wherein the lofting agent is effective to increase a thickness of the core layer after exposure to heat to provide a post-lofted core layer, an adhesive layer disposed on the first layer, the adhesive layer comprising a blend of a thermoplastic polymer and a thermosetting material, and a skin material disposed on the adhesive layer, in which the adhesive layer is effective to provide a peel strength between the skin material and the post-lofted core layer of at least 0.5 N/cm (in one or both of the machine direction or cross direction) as tested by DIN 53357 A dated Oct. 1, 1982 is disclosed.

In some examples, the method comprises providing instructions for curing the prepreg to form an underbody shield. In other examples, the method comprises providing instructions for molding the prepreg to form an underbody shield. In certain instances, the method comprises providing instructions for crosslinking the adhesive layer of the prepreg. In some examples, the method comprises providing instructions for lofting the core layer.

In an additional aspect, a composite material comprising a fiber reinforced polymer core comprising a lofting agent, a skin material disposed on at least some portion of a first surface of the fiber reinforced polymer core, in which the skin material comprises a basis weight of at least 65 gsm (grams per square meter) and an elongation at break of at least 20%, and an adhesive layer disposed between the skin material and the polymer core, the adhesive layer comprising a thermoplastic material and an effective amount of a thermosetting material to provide a post-lofting peel strength between the skin material and the polymer core of at least 0.5 N/cm (in one or both of the machine direction or cross direction) as tested by DIN 53357 A dated Oct. 1, 1982 is provided.

In some instances, the skin material is selected from the group consisting of a fabric, a scrim, a film and combinations thereof. In other instances, the fiber reinforced polymer core comprises a porosity of greater than 0% to about 95% by volume of the polymer core. In some embodiments, the fiber reinforced polymer core comprises fibers disposed within a polymer resin. In other embodiments, the skin material comprises a porous non-woven material comprising the basis weight of at least 65 gsm and the elongation at break of at least 20%. In certain examples, the skin material is disposed on an entire planar surface of the polymer core. In other examples, the skin material is disposed as a strip on a surface of the polymer core. In some examples, the composite material is constructed and arranged as a vehicular panel. In certain examples, the composite material is constructed and arranged as a vehicular underbody panel. In other examples, the composite material is constructed and arranged as an exterior automotive part. In some embodiments, the composite material is constructed and arranged as an interior automotive part. In other embodiments, the interior automotive part is a headliner and comprises a decorative layer disposed on the skin material. In some examples, the composite comprises a basis weight of less than about 3000 gsm. In further examples, the fiber reinforced polymer core comprises a porosity between about 20% to about 80% by volume of the core. In some configurations, the fiber reinforced polymer core comprises a porosity between about 30% to about 70% by volume of the core. In other examples, the fiber content of the fiber reinforced polymer core is from about 20 wt. % to about 80 wt. % of the polymer resin. In some embodiments, the fibers dispersed within the polymer resin comprise fibers including a diameter greater than about 5 microns and a length from about 5 mm to about 200 mm. In certain examples, the polymer resin is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In some instances, the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In some embodiments, the composite comprises an additional skin material disposed on a second surface of the polymer core and a second adhesive layer disposed between the additional skin material and the polymer core, the second adhesive layer comprising a thermoplastic material and an effective amount of a thermosetting material to provide a post-lofting peel strength for the additional skin material of at least 0.5 N/cm as tested by DIN 53357 A dated Oct. 1, 1982

In another aspect, a composite comprising a fiber reinforced polymer core comprising a lofting agent, a skin material disposed on a first surface of the fiber reinforced polymer core, the skin material comprising a basis weight of at least 65 gsm and an elongation at break of at least 20%, in which the composite is effective to permit deep drawing of the composite by at least 5 cm using a torture tool test method without breakthrough of the composite, the composite further comprising an adhesive layer disposed between the polymer core and the skin material, the adhesive layer comprising a thermoplastic material and an effective amount of a thermosetting material to provide a post-lofting peel strength between the skin material and the polymer core of at least 0.5 N/cm (in one or both of the machine direction or cross direction) as tested by DIN 53357 A dated Oct. 1, 1982 is described. Torture tool test methods are described, for example, in commonly assigned U.S. application Ser. No. 13/543,808, the entire disclosure of which is hereby incorporated herein by reference for all purposes.

In certain examples, the skin material is selected from the group consisting of a fabric, a scrim, a film and combinations thereof. In other examples, the skin material is selected from the group consisting of a porous non-woven material, a porous knit material, and combinations thereof. In some embodiments, the composite comprises a basis weight of less than about 3000 gsm. In other embodiments, the fiber reinforced polymer core comprises a porosity between about 20% to about 80% by volume of the core. In some examples, the fiber reinforced polymer core comprises a porosity between about 30% to about 70% by volume of the core. In certain configurations, the fiber reinforced polymer core comprises fibers disposed within a polymer resin. In other configurations, the fiber content of the fiber reinforced polymer core is from about 20 weight percent to about 80 weight percent of the polymer resin. In some instances, the fibers dispersed within the polymer resin comprise fibers having a diameter greater than about 5 microns and a length from about 5 mm to about 200 mm. In other examples, the polymer resin is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof.

In an additional aspect, a pre-molded composite comprising a fiber reinforced polymer core effective to melt during molding, a skin material disposed on the fiber reinforced polymer core, the skin material comprising a basis weight of at least 65 gsm and an elongation at break of at least 20%, the pre-molded composite further comprising an adhesive layer disposed between the polymer core and the skin material, the adhesive layer comprising a thermoplastic material and an effective amount of a thermosetting material to provide a post-lofting peel strength between the post-lofted polymer core and the skin material of at least 0.5 N/cm (in one or both of the machine direction or cross direction) as tested by DIN 53357 A dated Oct. 1, 1982 is disclosed.

In certain instances, the composite is effective to permit deep drawing of the composite by at least 5 cm using a torture tool test method without breakthrough of the composite. In other instances, the skin material is selected from the group consisting of a fabric, a scrim, a film and combinations thereof. In some embodiments, the skin material is selected from the group consisting of a porous non-woven material, a porous knit material, and combinations thereof. In other examples, the composite comprises a basis weight of less than about 3000 gsm. In some instances, the fiber reinforced polymer core comprises a porosity between about 20% to about 80% by volume of the core. In other examples, the fiber reinforced polymer core comprises fibers disposed within a polymer resin. In some embodiments, the fiber content of the fiber reinforced polymer core is from about 20 weight percent to about 80 weight percent of the polymer resin. In some instances, the fibers dispersed within the polymer resin comprise fibers having a diameter greater than about 5 microns and a length from about 5 mm to about 200 mm. In other examples, the polymer resin is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof.

In another aspect, a molded composite comprising a fiber reinforced polymer core, a skin material disposed on the fiber reinforced polymer core, the skin material comprising a basis weight of at least 65 gsm and an elongation at break of at least 20%, the molded composite material being formed from a molding process, the molded composite further comprising an adhesive layer disposed between the polymer core and the skin material, the adhesive layer comprising a thermoplastic material and an effective amount of a thermosetting material to provide a post-molding and post-lofting peel strength between the post lofted polymer core and the skin material of at least 0.5 N/cm (in one or both of the machine direction or cross direction) as tested by DIN 53357 A dated Oct. 1, 1982 is provided.

In certain embodiments, the composite comprises areas deeper than about 5 cm that were formed from the molding process. In other embodiments, the skin material is selected from the group consisting of a fabric, a scrim, a film and combinations thereof. In some examples, the skin material is selected from the group consisting of a porous non-woven material, a porous knit material, and combinations thereof. In other instances, the composite comprises a basis weight of less than about 3000 gsm. In some examples, the fiber reinforced polymer core comprises a porosity between about 20% to about 80% by volume of the core. In other instances, the fiber reinforced polymer core comprises fibers disposed within a polymer resin. In some embodiments, the fiber content of the fiber reinforced polymer core is from about 20 weight percent to about 80 weight percent of the polymer resin. In certain examples, the fibers dispersed within the polymer resin comprise fibers having a diameter greater than about 5 microns and a length from about 5 mm to about 200 mm.

In another aspect, a fiber reinforced composite comprising a fiber reinforced core layer comprising a polymer resin and fibers and a lofting agent each dispersed within the polymer resin, wherein the fiber reinforced polymer core material has a porosity of greater than 0% to about 95% by volume of the polymer core material, a porous non-woven skin material applied to a first surface of the fiber reinforced core layer, the skin material having a basis weight of at least 65 gsm and an elongation at break of at least 20%, and an adhesive layer disposed between the fiber reinforced core layer and the porous non-woven skin material, the adhesive layer comprising a thermoplastic material and an effective amount of a thermosetting material to provide a post-lofting peel strength between the post-lofted polymer core and the skin material of at least 0.5 N/cm (in one or both of the machine direction or cross direction) as tested by DIN 53357 A dated Oct. 1, 1982 is described.

In certain examples, the composite is in the form of a vehicular panel. In some embodiments, the composite is a vehicular underbody panel, an interior or exterior automotive part, or an automotive headliner. In certain instances, the composite is a panel selected from an underbody panel, a recreational vehicle panel, a motor vehicle body panel, a motor vehicle wall panel, a recreational vehicle wall or floor panel, or a motor home sidewall panel. In some examples, the composite comprises a basis weight of less than 3000 gsm. In some embodiments, the fiber reinforced polymer core material comprises a porosity between about 20% to about 80% by volume of the thermoplastic material. In other examples, the fiber reinforced polymer core material comprises a porosity between about 30% to about 70% by volume of the thermoplastic material. In certain instances, the fiber content of the fiber reinforced polymer core material is from about 20 weight percent to about 80 weight percent of the polymer resin. In other instances, the fibers dispersed within the polymer resin comprise fibers having a diameter greater than about 5 microns and a length from about 5 mm to about 200 mm. In some examples, the polymer resin is selected from the group consisting of polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyether imide, polyphenylene ether, polyphenylene oxide, polyphenylenesulphide, polyethers, polyetherketones, polyacetals, polyurethanes, polybenzimidazole, and copolymers and mixtures thereof. In certain examples, the fibers are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers and combinations thereof. In some instances, the polymer core is prepared by a method comprising adding reinforcing fibers and a polymer resin to an agitated liquid-containing foam to form a dispersed mixture of polymer resin and reinforcing fibers, depositing the dispersed mixture of reinforcing fibers and polymer resin onto a forming support element, evacuating the liquid to form a web, heating the web above the softening temperature of the polymer resin; and compressing the web to a predetermined thickness to form the polymer material. In some instances, the skin material comprises a polymer resin selected from polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyether imide, polyphenylene ether, polyphenylene oxide, polyphenylenesulphide, polyethers, polyetherketones, polyacetals, polyurethanes, polybenzimidazole, and copolymers or a mixture thereof. In other instances, the skin material further comprises fibers selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain configurations, the thermoplastic material of the adhesive comprises a polyolefin and the thermosetting material comprises an epoxy group or is an epoxy adhesive. In other configurations, the adhesive is a continuous non-film adhesive layer. In some instances, the skin material is produced using a method selected from the group consisting of needle-punch, hydroentanglement, spin-bonding, thermal-bonding, and combinations thereof. In other instances, the porous non-woven skin material is a fabric or a film. In some embodiments, the composite comprises an intermediate layer disposed between the polymer core and the non-woven skin material.

In an additional aspect, a method of forming a composite material comprising adding reinforcing fiber, a polymer resin and a lofting agent to an agitated liquid-containing foam to form a dispersed mixture of polymer resin, lofting agent and reinforcing fibers, depositing the dispersed mixture of reinforcing fibers and polymer resin onto a forming support element, evacuating the liquid to form a web, heating the web above the softening temperature of the polymer resin, compressing the web to a predetermined thickness to form the polymer material, disposing an adhesive on the compressed web, and disposing a skin material on the disposed adhesive, the disposed adhesive comprising a thermoplastic material and an effective amount of a thermosetting material to provide a post-lofting peel strength for the disposed skin material of at least 0.5 N/cm (in one or both of the machine direction or cross direction) as tested by DIN 53357 A dated Oct. 1, 1982 is provided. In some instances, the method comprises disposing the adhesive on the compressed web by co-spraying a thermoplastic material and a thermosetting material on the compressed web. In other instances, the method comprises disposing the adhesive on the compressed web by spraying a mixture comprising the thermoplastic material and the thermosetting material.

In another aspect, a method of forming a composite material comprising adding reinforcing fiber, a polymer resin and a lofting agent to an agitated liquid-containing foam to form a dispersed mixture of polymer resin, lofting agent and reinforcing fibers, depositing the dispersed mixture of reinforcing fibers and polymer resin onto a forming support element, evacuating the liquid to form a web, heating the web above the softening temperature of the polymer resin, compressing the web to a predetermined thickness to form the polymer material, disposing an adhesive on the compressed web, disposing a skin material on the disposed adhesive to provide a pre-lofted composite material, the disposed adhesive comprising a thermoplastic material and a thermosetting material, and lofting the pre-lofted composite material to provide a post-lofted composite material and to provide a post-lofted peel strength for the disposed skin material of at least 0.5 N/cm (in one or both of the machine direction or cross direction) as tested by DIN 53357 A dated Oct. 1, 1982 is disclosed. In some examples, the method comprises lofting the pre-lofted composite material using heat. In other examples, the method comprises providing the heat using a convection infrared oven.

In an additional aspect, a vehicle comprising a frame, a body coupled to the frame; and an underbody shield comprising any one or more of the compositions described herein, the prepregs or cores described herein or the composites described herein coupled to the frame is provided.

Additional features, aspect, examples, configurations and embodiments are described in more detail below.

BRIEF DESCRIPTION OF THE FIGURES

Certain embodiments are described with reference to the accompanying figures in which:

FIG. 16 is a table showing various measured peel strengths for control and test samples, in accordance with certain examples; and FIG. 17 is a table showing the average values of the measured peel strengths, in accordance with certain embodiments.

Figure 1:
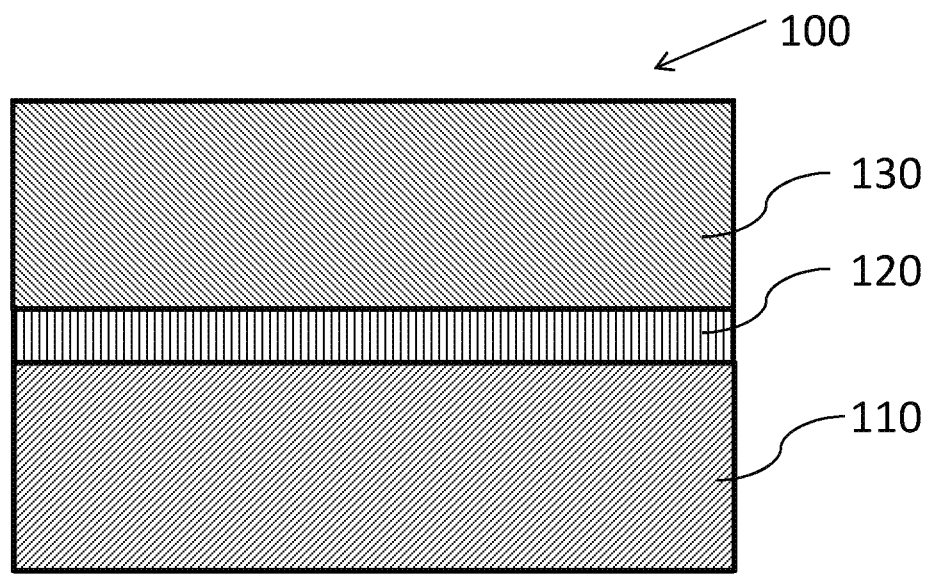
FIG. 1 is an illustration of a core layer coupled to a skin layer through an adhesive layer, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar materials, if desired.

DETAILED DESCRIPTION

Certain embodiments are described below with reference to singular and plural terms in order to provide a more user friendly description of the technology disclosed herein. These terms are used for convenience purposes only and are not intended to limit the prepregs, cores, articles, composites and other subject matter as including or excluding certain features unless otherwise noted as being present in a particular embodiment described herein.

In certain instances, the materials described herein are typically used together to provide an underbody shield which can be coupled to the underside of a vehicle. While some illustrations below refer to coupling of an underbody shield to a passenger automobile, the underbody shields can also be used in commercial vehicles, recreational vehicles, all-terrain vehicles and in other vehicles comprising a gas engine, hybrid engine, electric engine, fuel cell as an engine and the like. Further, the underbody shields can be used in other areas of the engine compartment, e.g., as an engine cover or positioned along the side of an engine block, as wheel well liners, as trunk liners or in other vehicular applications where a composite panel can be used.

Certain configurations described herein refer to peel strength. The peel strength values referenced herein are measured in accordance with DIN 53357 A dated Oct. 1, 1982 and are based on measurements performed on a final composite article (comprising the core, adhesive and any skin layers) that has been molded or otherwise processed. Reference below to DIN 53357A refers to the version of this protocol dated Oct. 1, 1982. For example, certain configurations refer to a post-mold peel strength. As discussed herein, many conventional underbody shields fail during processing as the skin layer separates from the core layer during molding or other processing operations. By including the combination of a core layer, adhesive layer and skin layer described herein, the peel strength can be enhanced and peeling of the skin layer from the core layer can be avoided or reduced during processing operations. In some instances, the composite article may be molded or drawn into a desired shape without any substantial separation of the skin layer from the core layer.

In some instances, the peel strength of the articles described herein may comprise a post-processing, e.g., post-molding, peel strength between the skin material and a core or a post lofted core layer of at least 0.4 N/cm in the machine direction as tested by DIN 53357 A. In other instances, the peel strength of the articles described herein may comprise a post-processing, e.g., post-molding, peel strength between the skin material and a core or a post lofted core layer of at least 0.4 N/cm in the cross direction as tested by DIN 53357 A. In additional configurations, the peel strength of the articles described herein may comprise a post-processing, e.g., post-molding, peel strength between the skin material and a core or a post lofted core layer of at least 0.5 N/cm in the machine direction as tested by DIN 53357 A. In other instances, the peel strength of the articles described herein may comprise a post-processing, e.g., post-molding, peel strength between the skin material and a core or a post lofted core layer of at least 0.5 N/cm in the cross direction as tested by DIN 53357 A. In other examples, the peel strength of the articles described herein may comprise a post-processing, e.g., post-molding, peel strength between the skin material and a core or a post lofted core layer of at least 0.6 N/cm in the machine direction as tested by DIN 53357 A. In other instances, the peel strength of the articles described herein may comprise a post-processing, e.g., post-molding, peel strength between the skin material and a core or a post lofted core layer of at least 0.6 N/cm in the cross direction as tested by DIN 53357 A. In some embodiments, the machine direction peel strength may be between about 0.4-0.9, more particularly about 0.5-0.9 N/cm or 0.6-0.9 N/cm or 0.7-0.9 N/cm as tested by DIN 53357 A. In other embodiments, the cross direction peel strength may be between about 0.4-0.9, more particularly about 0.5-0.9 N/cm or 0.6-0.9 N/cm or 0.7-0.9 N/cm as tested by DIN 53357 A. Peel strength may be measured from the top of the article or the bottom of the article. While not true in all cases, the peel strength when measured from the top of the article is typically different than the peel strength when measured from the bottom of the article. For example, in some instances, peel strength from the top may be about 0.4-0.9 N/cm when measured from the top side of the article and about 0.9-5 N/cm when measured from the bottom of the article and when tested by DIN 53357 A. In some instances, the peel strength of the articles (as tested by DIN 53357 A) described herein may be increased by at least 125%, 150%, 175%, 200%, 250%, 300% or 400% or more compared to a test article lacking an adhesive layer between the skin material and the core layer.

In certain examples, the underbody shield compositions described herein may comprise a core layer, a skin layer and an adhesive layer between the core layer and the skin layer. Referring to FIG. 1, a simplified illustration of an underbody shield board which can be formed into an underbody shield, e.g., using molding, drawing or other forming processes, is shown. The board 100 comprises a core layer 110, a skin layer 130 and an adhesive layer 120 disposed between the core layer 110 and the skin layer 130. The particular dimensions shown in FIG. 1 have been enlarged for illustration and no particular thickness of one component, relative to the thickness of another component, is intended to be applied. As noted in more detail below, the core layer 110 generally comprises a web of open cell structures formed by or from random crossing over of reinforcing fibers held together by a thermoplastic polymer or other material. In certain instances, the thermoplastic core layer 110 may also comprise a lofting agent effective to increase a thickness of the core layer upon exposure to heat to provide a post lofted core layer. As noted herein, the lofting process and/or any molding operations may result in the skin layer 130 peeling away from the core layer 110. In order to increase the bond strength between the skin layer 130 and the core layer 110, the adhesive layer 120 may comprise both a thermoplastic polymer and an effective amount of a thermosetting material to provide a post-molding peel strength between the skin layer 130 and the post lofted core layer 110 of at least 0.5 N/cm (in either or both of the machine direction or cross direction) as tested by DIN 53357 A dated Oct. 1, 1982. In some instances, the molding process and the lofting process may be performed together, e.g., by placing the board 100 into a heated mold and applying a sufficient amount of heat to mold the board and loft the core of the board. The particular amounts and types of thermoplastic polymers and thermosetting materials in the adhesive layer 120 are discussed in more detail below. While not wishing to be bound by any particular theory, the amount of thermoplastic polymer (by weight of the adhesive layer) present in the adhesive layer 120 is generally greater than the amount of thermosetting material (by weight of the adhesive layer) present in the adhesive layer 120.

Figure 2:
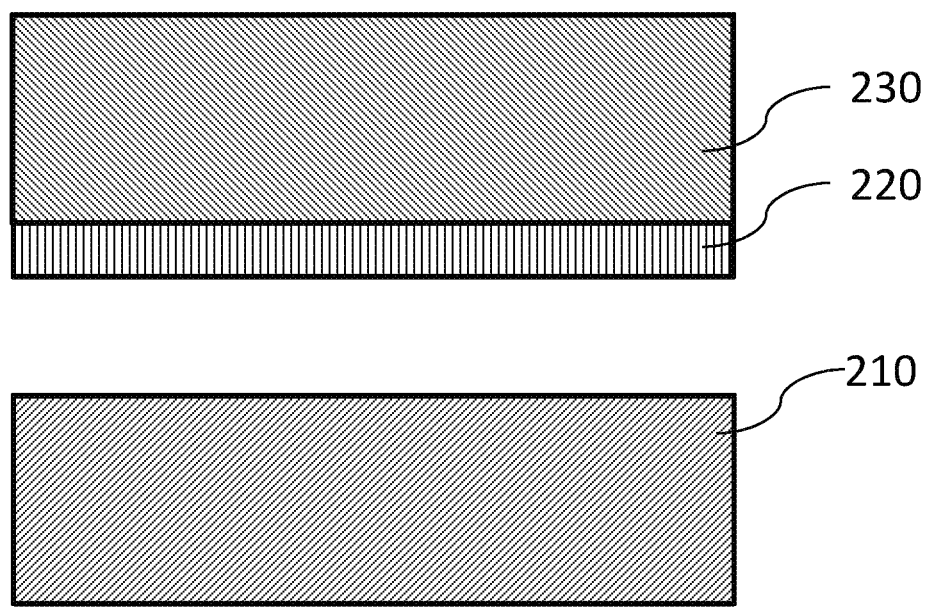
FIG. 2 is an illustration showing an adhesive layer disposed on a skin layer that is separate from a core layer, in accordance with certain configurations.

In certain embodiments, an adhesive layer can be present on the skin material that is disposed on a core layer. Referring to FIG. 2, a core layer 210 is shown separate from a skin layer 230 comprising an adhesive layer 220 disposed on a surface of the skin layer 230. The adhesive layer 220 may comprise both a thermosetting material and a thermoplastic polymer so when the skin layer 230 is bonded to the core layer 210, a post-molding peel strength between the skin layer 230 and the post lofted core layer 210 of at least 0.5 N/cm (in either or both of the machine direction or cross direction) as tested by DIN 53357 A is provided. In some instances, the core layer 210 can be heated to soften the thermoplastic material (to at least some degree) prior to coupling the skin layer 230 with adhesive layer 220 to the core layer 210. In other instances, the adhesive layer 220 can be heated to soften the thermoplastic polymer (to at least some degree) prior to coupling the skin layer 230 with the adhesive layer 220 to the core layer 210. In other configurations, both the core layer 210 and the adhesive layer 220 can be heated to soften the thermoplastic material of the layer 210 (to at least some degree) and to soften the thermoplastic polymer of the layer 220 (to at least some degree) prior to coupling the skin layer 230 with the adhesive layer 220 to the core layer 210. If desired, the adhesive layer 220 can also be heated to a suitable temperature to crosslink some of the thermosetting material, e.g., 5-10%, prior to disposing the skin layer 230 on the core layer 210. In addition, the skin material of the layer 230 can be heated or processed in some manner as well.

Figure 3:
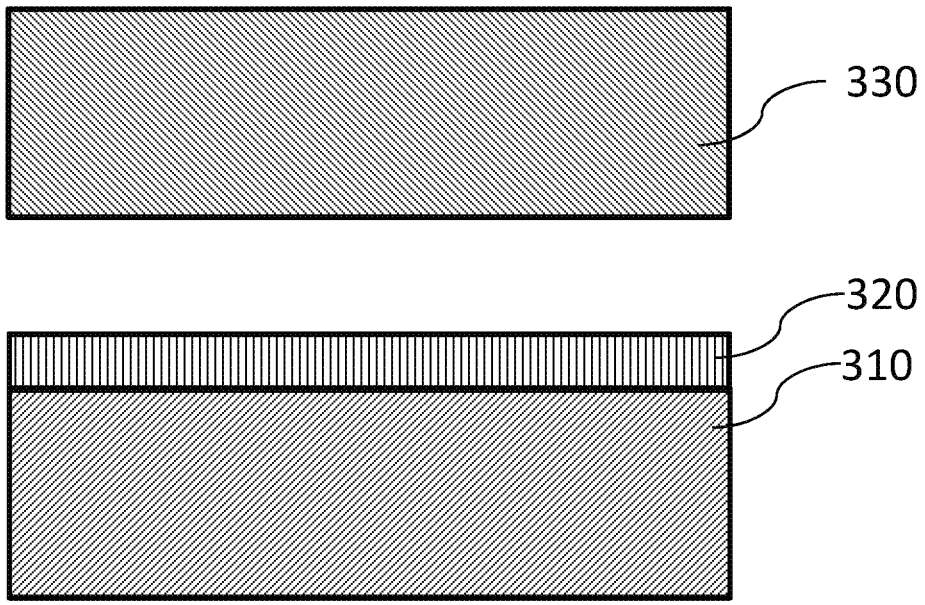
FIG. 3 is an illustration showing an adhesive layer disposed on a core layer that is separate from a skin layer, in accordance with certain configurations.

In certain examples, an adhesive layer can be present on the core layer that is coupled to a skin layer. Referring to FIG. 3, a core layer 310 comprising an adhesive layer 320 is shown separate from a skin layer 330. The adhesive layer 320 may comprise both a thermosetting material and a thermoplastic polymer so when the skin layer 330 is bonded to the core layer 310, a post-molding peel strength between the skin layer 330 and the post lofted core layer 310 of at least 0.5 N/cm (in either or both of the machine direction or the cross direction) as tested by DIN 53357 A is provided. In some instances, the core layer 310 can be heated to soften the thermoplastic material (to at least some degree) prior to coupling the skin layer 330 to the core layer 310. In other instances, the adhesive layer 320 can be heated to soften the thermoplastic polymer (to at least some degree) prior to coupling the skin layer 330 to the core layer 310. In other configurations, both the core layer 310 and the adhesive layer 320 can be heated to soften the thermoplastic material of the layer 310 (to at least some degree) and to soften the thermoplastic polymer of the layer 320 (to at least some degree) prior to coupling the skin layer 330 to the core layer 310. If desired, the adhesive layer 320 can also be heated to a suitable temperature to crosslink some of the thermosetting material, e.g., 5-10%, prior to disposing the skin layer 330 on the core layer 310. In addition, the skin material of the layer 330 can be heated or processed in some manner as well.

Figure 4:
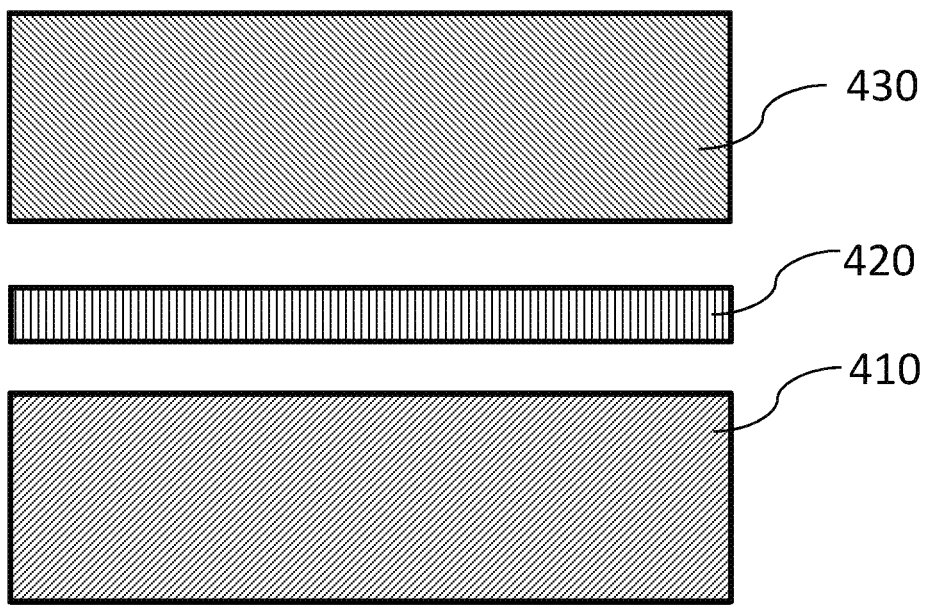
FIG. 4 is an illustration showing an adhesive layer disposed on a core layer that is separate from a skin layer comprising an adhesive layer, in accordance with certain configurations.

In certain configurations, an adhesive layer can be separate from and disposed on one or both of a core layer and a skin layer. Referring to FIG. 4, a core layer 410 is shown separate from an adhesive layer 420 and a skin layer 430. The adhesive layer 420 may comprise both a thermosetting material and a thermoplastic polymer so when the skin layer 430 is bonded to the core layer 410 through the adhesive layer 420, a post-molding peel strength between the skin layer 430 and the post lofted core layer 410 of at least 0.5 N/cm (in either or both of the machine direction or the cross direction) as tested by DIN 53357 A is provided. In some instances, the core layer 410 can be heated to soften the thermoplastic material (to at least some degree) prior to coupling the skin layer 430 to the core layer 410. In some configurations, the adhesive layer 420 can be sprayed, rolled or otherwise disposed on one or both of the core layer 410 or the skin layer 430 prior to coupling the skin layer 430 to the core layer 410. In other configurations, the core layer 410 can be heated to soften the thermoplastic material of the layer 410 (to at least some degree) and the adhesive layer 420 can be disposed on the softened core layer 410 prior to coupling the skin layer 430 to the core layer 410. If desired, the adhesive layer 420 can disposed at a suitable temperature to provide a desired consistency or thickness or to crosslink some of the thermosetting material, e.g., 5-10%, prior to disposing the skin layer 430 on the core layer 410. In certain instances, the adhesive layer 420 can be disposed on the core layer 410, permitted to cross-link to at least some extent and then the skin layer 430 may be disposed on to the core layer 410 with the disposed adhesive layer. In addition, the skin material of the layer 430 can be heated or processed in some manner as well.

Figure 5:
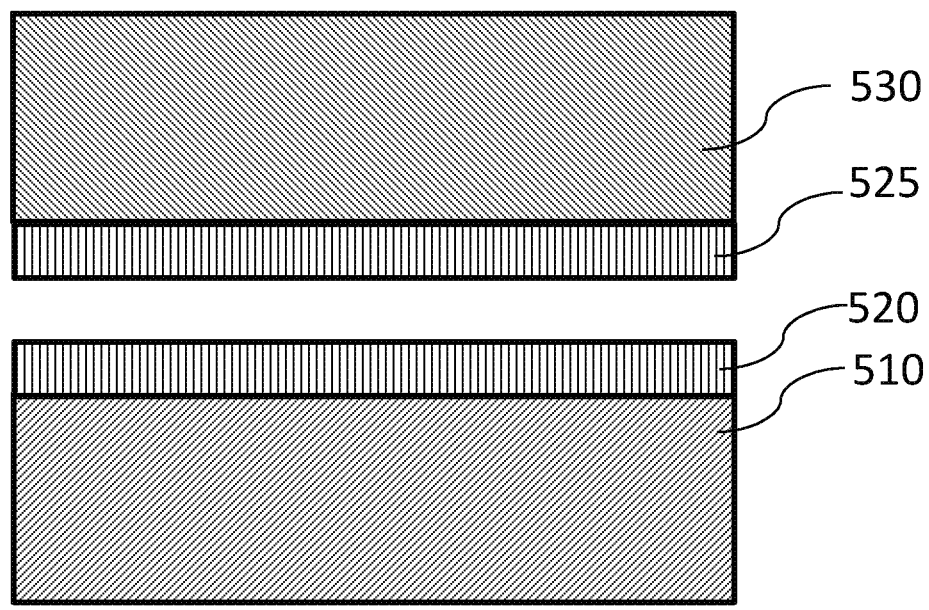
FIG. 5 is an illustration showing an adhesive layer disposed on a core layer and an adhesive layer disposed on a skin layer, in accordance with certain configurations.

In certain embodiments, one component of the adhesive layer can be disposed on a core layer and another component of the adhesive layer can be disposed on a skin material. Referring to FIG. 5, a core layer 510 is shown as comprising an adhesive layer 520 on one surface, and a skin layer 530 is shown as comprising a second adhesive layer 525 on one surface. In some instances, the adhesive layer 520 comprises a thermoplastic polymer, and the adhesive layer 525 comprises a thermosetting material. In other configurations, the adhesive layer 525 comprises a thermoplastic polymer, and the adhesive layer 520 comprises a thermosetting material. In some examples, the adhesive layer 520 comprises a first thermoplastic polymer, and the adhesive layer 525 comprises a second thermoplastic polymer (different from the first polymer) and a thermosetting material. In other examples, the adhesive layer 520 comprises a first thermosetting material, and the adhesive layer 525 comprises a thermoplastic polymer and a second thermosetting material. In further configurations, the adhesive layer 520 comprises a first thermoplastic polymer and a thermosetting material, and the adhesive layer 525 comprises a second thermoplastic polymer. In additional examples, the adhesive layer 520 comprises a first thermoplastic polymer and a first thermosetting material, and the adhesive layer 525 comprises a second thermoplastic polymer and a second thermosetting material. In other configurations, the adhesive layer 520 comprises two or more thermoplastic polymers, and the adhesive layer 525 comprises at least one thermosetting material, e.g., two or more thermosetting materials optionally in the presence of a thermoplastic polymer. The adhesive layers 520, 525 together can be used to bond the skin layer 530 to the core layer 510 to provide a post-molding peel strength between the skin layer 530 and the post lofted core layer 510 of at least 0.5 N/cm (in either or both of the machine direction or the cross direction) as tested by DIN 53357 A. In some instances, the core layer 510 and/or the adhesive layer 520 can be heated to soften the thermoplastic material (to at least some degree) prior to coupling the skin layer 530 to the core layer 510. In other instances, the adhesive layer 525 can be softened (to at least some degree) prior to coupling the core layer 510 and the skin layer 530. In some configurations, each of the adhesive layers 520, 525 can independently be sprayed, rolled or otherwise disposed on their respective underlying layers prior to coupling the skin layer 530 to the core layer 510. In other configurations, the core layer 510 can be heated to soften the thermoplastic material of the layer 310 (to at least some degree) and the adhesive layer 520 can be disposed on the softened core layer 510 prior to coupling the skin layer 530 to the core layer 510. If desired, the adhesive layer 520 or the adhesive layer 525 can disposed at a suitable temperature to provide a desired consistency or thickness or to crosslink some of the thermosetting material, e.g., 5-10%, prior to disposing the skin layer 530 on the core layer 510. In certain instances, the adhesive layer 520 can be disposed on the core layer 510, permitted to cross-link to at least some extent and then the skin layer 530 with adhesive layer 525 may be disposed on to the core layer 510 with the disposed adhesive layer 520. In addition, the skin material of the layer 530 can be heated or processed in some manner as well.

Figure 6:
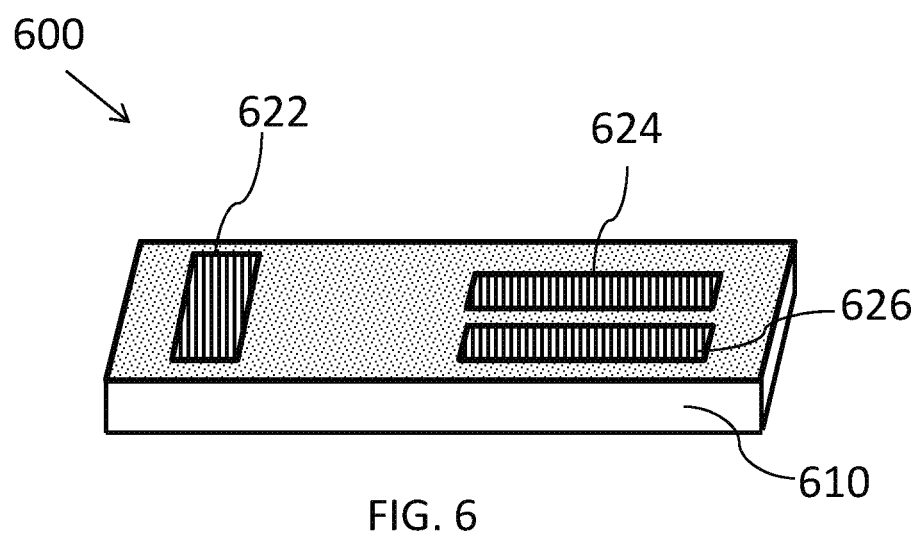
FIG. 6 is an illustration showing strips disposed on a core layer, in accordance with certain embodiments.

In certain embodiments, the adhesive used in the composite articles and materials described herein need not include a uniform or homogeneous distribution of thermosetting material. For example, it may be desirable to include a thermosetting material in areas of the board that are to be subjected to a deep draw process, are stretched or are otherwise subjected to forces that might result in separation of the skin layer from the core layer. Referring to FIG. 6, an exploded view of a composite article 600 is shown that includes a core layer 610, shown as a generally planar substrate, an adhesive layer (omitted for clarity) comprising a thermoplastic polymer, and a skin layer (also omitted for clarity). Disposed on the core layer 610 in select regions are strips or regions 622, 624 and 626 of adhesive material comprising a thermosetting material. The strips 622, 624 and 626 can be disposed at sites that may be pre-disposed to separation due to molding or processing operations performed on the composite article. For example, many of the composite articles may be subjected to a deep draw process where valleys, depressions or other areas having a depth of 5 mm or more are formed. The forces used to form such features may result in separation of the composite article components. To reduce the likelihood of separation or avoid layer separation, the adhesive strips can be placed at selected areas prior to coupling the adhesive layer (or skin layer) to the core layer 610. In some instances, the strips 622, 624, and 626 may independently be sprayed on, rolled on, brushed on or otherwise disposed on the core layer 610. In another configuration, instead of disposing the strips 622, 626 and 626 on the core layer 610, the strips could instead be disposed on the underside of the adhesive layer (or skin layer). For example, adhesive strips comprising a thermosetting material could be disposed onto select areas of the adhesive layer prior to coupling the adhesive layer to the core layer 610. The adhesive layer can be softened or heated to a desired temperature prior to coupling a layer to the core layer 610. The exact number of strips used can vary from one to ten or more. In some instances, it may be desirable to space a plurality of strips adjacent to each other such that the thermoplastic polymer of the adhesive layer can contact the surface of the core layer 610 between the strips, e.g., the strips can be spaced about 0.5 mm to about 5 mm apart. Such an arrangement may further enhance bonding of the core layer 610 to the skin layer. While the strips 622-626 are described in reference to FIG. 6 as including a thermosetting material, the strips may instead include a thermoplastic polymer and the adhesive layer may comprise a thermosetting material. For example, an adhesive layer comprising a thermosetting material can be coupled to the thermoplastic strips such that the combination of the materials provided enhanced bonding between the core layer 610 and the skin layer. Alternatively, the strips can be disposed on a skin layer that is then coupled to a core layer comprising an adhesive layer disposed thereon.

The thermoplastic composite articles described herein are often molded or processed into various shapes to provide a final formed part or article. During processing, it may be desirable to increase the overall thickness of one or more components or layers of the article to be processed. In some configurations described herein, the presence of a lofting agent in a thermoplastic prepreg or a thermoplastic core permits alteration of the overall thickness of the article (or a portion thereof) during heating, molding or other temperature or processing operations. In some instances, the lofting agent can be dispersed, e.g., in a substantially uniform distribution from surface to surface if desired, in void space of a thermoplastic prepreg or core comprising a thermoplastic material and a plurality of fibers. In certain examples, the lofting agent may be present in the prepreg or core but not covalently bonded to the other materials in the prepreg or core. In further examples, the lofting agent may be covalently bonded to one or more groups present in the thermoplastic material or covalently bonded to one or more groups of the plurality of fibers or both. The exact lofting temperature used can vary depending on the other materials present in the prepregs, cores and articles, and in some instances, the lofting temperature may be greater than or equal to the melting point temperature of the thermoplastic material(s) present in the prepregs, cores and articles.

In certain configurations, the articles described herein can comprise a prepreg or core layer. While not wishing to be bound by any particular theory, a prepreg is generally not a fully cured or processed version of a core. For example, a partially cured layer comprising a thermoplastic material, a plurality of fibers and a lofting agent is generally referred to as a prepreg, whereas a fully cured layer (which may or may not yet be lofted) comprising thermoplastic material, a plurality of fibers and a lofting agent is generally referred to as a core or core layer. As noted herein, even though the core may be considered cured, the core can still be further processed to increase its thickness, to alter its shape or to otherwise provide a formed article or product suitable for an intended use. The description below makes reference to both a prepreg and a core and the materials (and their amounts and properties) used in connection with a prepreg can also be used in a core if desired.

In certain configurations described herein, a suitable amount of a lofting agent is included in the prepregs core and articles to provide for selective lofting of the prepregs, cores and articles. Lofting generally refers to an overall increase in thickness of the prepreg, core or article during or after a processing condition, e.g., application of heat and/or pressure. For example, a lofting agent can be selected such that the prepreg, core or article is substantially insensitive to loft at a first temperature and/or first heating conditions and then is sensitive to loft at a second temperature and/or second heating conditions. In certain automotive applications, the lofting agent can be selected to not substantially loft at 180-190 or 190-200 deg. Celsius and to loft at 210 or 220 deg. Celsius. While not wishing to be bound by any particular theory, the first and second temperatures can vary depending on the thermoplastic material present in the prepreg, core or article. In certain instances, the lofting agent is selected such that substantially no loft occurs until the loft temperature is about 20 deg. Celsius or more than higher the melting point of the thermoplastic material in the prepreg or core layer. In other instances, the lofting agent is selected such that substantially no loft occurs until the loft tempera-
ture is about 40 deg. Celsius or more higher than the melting point of the thermoplastic material in the core layer. In further instances, the lofting agent (and/or the lofting conditions) is selected such that substantially no loft occurs until the loft temperature is about 60 deg. Celsius or more higher than the melting point of the thermoplastic material of the core layer. In some instances, the lofting agent is selected such that substantially no loft occurs until the loft temperature is about 80 deg. Celsius or more higher than the melting point of the thermoplastic material in the core layer.

In certain examples, the lofting agent of the prepregs and cores described herein may comprise one or more liquid hydrocarbon-polymer shell materials. The exact type of lofting agent used in the core can depend on numerous factors including, for example, the desired lofting temperature, the desired basis weight, desired processing conditions and other factors. Illustrative commercially available lofting agents that can be present in a prepreg or core are commercially available from Kureha Corp. (Japan) and include, for example, H1100 liquid hydrocarbon core-polymer microspheres. The lofting agent can be present in many forms including fiber form, particle form, microsphere form or other forms. In some instances, the lofting agent can be present in microsphere form and may comprise an average particle size of at least 40 microns, for example, or may comprise an average particle size that is substantially similar to the average particle size of thermoplastic material in the core. In some examples, the lofting agent may be present from about 2 weight percent to about 20 weight percent, though depending on the desired degree of loft, more or less lofting agent can be used in the prepreg or core.

In certain configurations, a porous prepreg comprising one or more thermoplastic materials and a plurality of fibers that together have an open cell structure, e.g., void space, can be produced. In some configurations, a lofting agent can be loaded into the void space in a manner where the lofting agent generally does not covalently bond with the thermoplastic materials and/or the fibers. For example, the thermoplastic materials and/or the fibers can be selected so that they are generally inert or non-reactive with the lofting agent. Even though the lofting agent may not covalently bond to the thermoplastic material and/or the fibers, there can be covalent bonding present in or within the lofting agent itself. In other instances, it may be desirable to covalently bond the lofting agent to the thermoplastic materials, the fibers or both to provide some covalently bonded lofting agent in the prepreg. Even where bonded lofting agent is present, the lofting agent desirably can still increase their occupied volume under suitable conditions such as, for example, convection heating to permit lofting of the prepreg. In some instances, both covalently bonded lofting agent and non-covalently bonded lofting agent materials may also be present in the prepreg. While some configurations of the prepregs may comprise lofting agent where about 100% of the lofting agent materials are non-covalently bonded, weak interactions such as van der Waals' interactions or electrostatic interactions can take place between the lofting agent and the other components of the prepreg.

Figure 7:
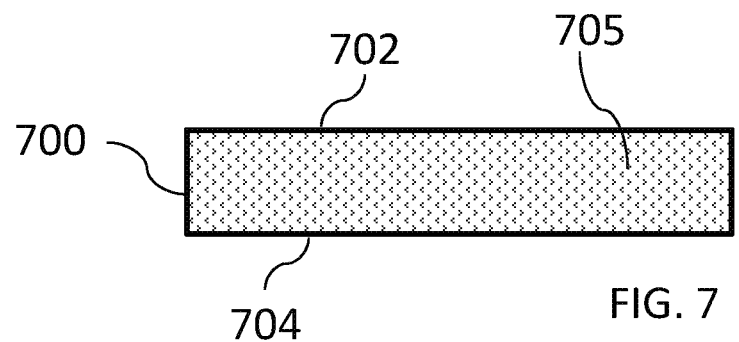
FIG. 7 is an illustration of a prepreg or core, in accordance with certain embodiments.
Figure 8A:
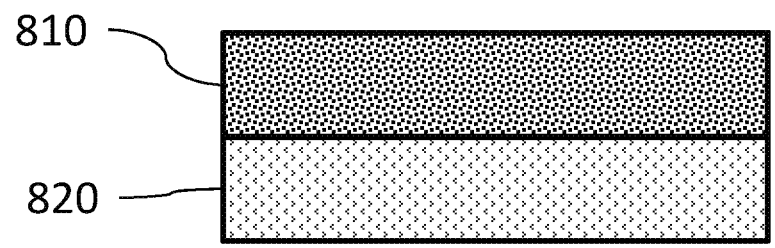
FIGS. 8A-8C are illustrations showing two prepregs coupled to each other, in accordance with certain examples.
Figure 8B:
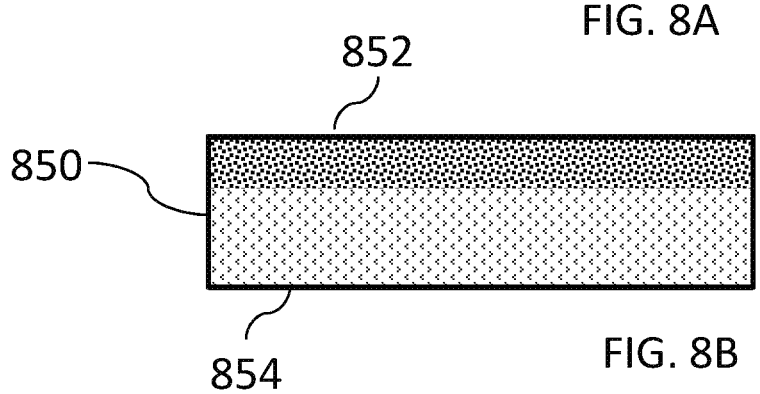

In certain examples and referring to FIG. 7, a prepreg 700 is shown that comprises a thermoplastic material and a plurality of fibers. The prepreg 700 also comprises a lofting agent (shown for illustration purposes as dots 705) dispersed through the prepreg 700. In some instances, the lofting agent dispersion can be substantially homogeneous or substantially uniform from a first surface 702 to a second surface 704 of the prepreg 700. As described in more detail herein, to achieve such substantially homogeneous or substantially uniform distribution of lofting agent in the prepreg 700, the components of the prepreg 700 can be mixed together to form a substantially uniform dispersion. Mixing can be performed until the dispersion comprises a substantially homogeneous or substantially uniform mixture of the lofting agent, the thermoplastic materials and the fibers in the dispersion. The prepreg 700 may then be formed as described herein, e.g., by disposing the dispersion on a wire screen using a suitable laying process. In other configurations, it may be desirable to provide a gradient distribution of lofting agent from the surface 702 to the surface 704 such that more lofting agent materials are present toward one of the surfaces 702, 704 than the other surface. In some embodiments, a substantially uniform distribution of lofting agent is present in a prepreg 700 and then additional lofting agent is added to one side of the prepreg 700 to provide a gradient distribution. Such additional lofting agent can be added directly to the prepreg 700, e.g., by spraying or coating a solution comprising the lofting agent, or can be added by coupling a skin, additional prepreg or other component comprising lofting agent to the prepreg 700. For example and referring to FIG. 8A, a first prepreg 810 and a second prepreg 820 disposed on the first prepreg 810 is shown. Each of the first prepreg 810 and the second prepreg 820 comprises a substantially uniform distribution of lofting agent, but the amount of lofting agent in the prepregs 810, 820 is different. If desired, however, only one of the prepregs 810, 820 may comprise a lofting agent and the other prepreg may not comprise a lofting agent or may comprise a different lofting agent. The thermoplastic materials of the prepregs 810, 820 can be melted to provide a single prepreg 850 (FIG. 8B). The result of melting of the prepregs 810, 820 together is a gradient distribution of lofting agent in the prepreg 850 with increased amounts of lofting agent adjacent to a surface 852 as compared to the amount present adjacent to a surface 854. The exact overall thickness of the prepreg 850 may vary depending on the conditions used and no particular thickness is intended to be implied in FIG. 8B.

Figure 8C:
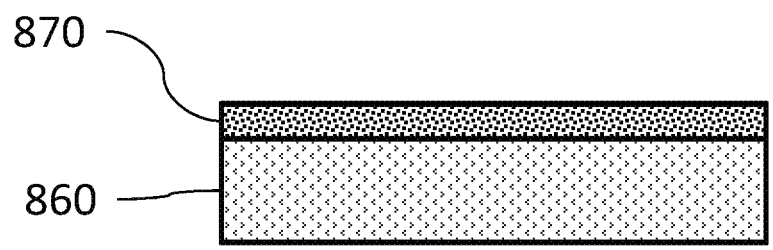

In other configurations, a distribution of lofting agent in a prepreg can be provided by coupling a skin or other material comprising lofting agent to the prepreg. Referring to FIG. 8C, a skin 870 comprising lofting agent is shown as being disposed on a prepreg 860 comprising a thermoplastic material, reinforcing fibers and lofting agent. While not required, the skin 870 is typically present at a much lower thickness than a pre-lofted thickness of the prepreg 860. In addition, a discernible interface is typically present between the skin 870 and the prepreg 860, whereas coupling of two prepregs to each other, as described in connection with FIG. 8B, generally does not result in any discernible interface in the finally coupled prepreg 850. In other instances, the skin 870 can be melted into the prepreg 860 to couple the skin 870 and the prepreg 860 to leave a coupled skin/prepreg composite material without any substantial interface. If desired and as described in more detail below, an additional skin, which may or may not comprise lofting agent, can also be coupled to the prepreg on an opposite side from the skin 870.

In certain configurations, the thermoplastic material of the prepreg may be present in fiber form, particle form, resin form or other suitable forms. In some instances, the thermoplastic material used in the prepreg can be present in particle form and have an average particle size that is substantially the same as the average particle size of the lofting agent. While not wishing to be bound by any particular scientific theory, by matching the particles sizes of the thermoplastic material and the lofting agent, enhanced processing of the prepregs including, for example, increased retention of the lofting agent in the prepreg can be achieved. In some instances, the average particle size of the lofting agent and the average particle size of the thermoplastic material can vary by about 5% to about 10% and enhanced processing can still be achieved. In certain configurations, the average particle size of each of the thermoplastic material and the lofting agent in the prepreg can differ by about 50 microns to about 120 microns. In some configurations, the average particle size of the lofting agent is at least 50% of the average particle size of the thermoplastic material particles to provide for enhanced processing. In other instances, lofting agent with an average particle size about the same as the average particle size of the thermoplastic material can be present along with lofting agent of an average particle size that is different than the average particle size of the thermoplastic material. Even though the average particle size of the lofting agent may differ, the chemical composition of the lofting agent can be the same or can be different. In yet other configurations, two or more thermoplastic materials with different average particle sizes can be present. If desired, two lofting agents with average particle sizes that are substantially the same as the average particle sizes of the thermoplastic materials can be present. The two lofting agents may be chemically the same or may be chemically distinct. Similarly, the thermoplastic materials can be chemically the same (but have a different average particle size) or can be chemically distinct.

In certain embodiments, the prepreg or core generally comprises a substantial amount of open cell structure such that void space is present in the prepreg. For example, the prepreg or core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% (based on the volume of the prepreg or core) or any illustrative value within these exemplary ranges. In some instances, the prepreg comprises a porosity or void content of greater than 0%, e.g., is not fully consolidated, up to about 95%. Unless otherwise stated, the reference to the prepreg comprising a certain void content or porosity is based on the total volume of the prepreg and not necessarily the total volume of the prepreg plus any other materials or layers coupled to the prepreg.

In certain embodiments, the high porosity present in the prepreg or core permits trapping of lofting agent within the pores of the prepreg. For example, lofting agent can reside in the void space in a non-covalently bonded manner. Application of heat or other perturbations can act to increase the volume of the non-covalently bonded lofting agent which in turn increases the overall thickness of the prepreg or core, e.g., the prepreg or core thickness increases as the size of the lofting agent increases and/or additional air becomes trapped in the prepreg. For example, the lofting agent can be operative as a heat-sensitive agent such that application of a suitable stimulus, e.g., radiant heat, functions to increase the overall thickness of the prepreg. In some instances, the lofting agent can be configured as a binary lofting agent which can expand from no loft to full loft after application of a stimulus such as heat. In additional configurations, the lofting agent can be a linear lofting agent whose size increases substantially linearly with increasing temperature until the lofting agent reaches full loft. In other instances, the lofting agent can be a step-wise lofting agent, e.g., a step-wise lofting agent in the form of microspheres. As used herein, step-wise lofting or a step-wise lofting agent refers to a lofting agent whose thickness increases with temperature, then plateaus, then increases again with increasing temperature. The step-wise increase in volume provides for enhanced control of overall prepreg thickness and reduces the likelihood of over-loft. A desired thickness using a prepreg comprising a lofting agent can be achieved by selecting a suitable processing temperature. If the thickness is not sufficient, in many instances, a higher temperature can then be applied to increase overall thickness to a desired thickness.

In certain embodiments, the thermoplastic material of the prepregs or cores described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the prepreg can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg can vary and illustrative amounts range from about 20% by weight to about 80% by weight, e.g., 30-70 percent by weight or 35-65 percent by weight.

In certain examples, the fibers of the prepregs described herein can comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, the fibers used in the prepreg can first be reacted with the lofting agent to provide a derivatized fiber that is then mixed with the thermoplastic material. Alternatively, the lofting agent can be reacted with the thermoplastic material of the prepreg to provide a derivatized thermoplastic material that is then mixed with the fibers. The fiber content in the prepreg may be from about 20% to about 90% by weight of the prepreg, more particularly from about 30% to about 70%, by weight of the prepreg. Typically, the fiber content of a composite article comprising the prepreg varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material and lofting agent to provide a prepreg generally have a diameter of greater than about 5 microns, more particularly from about 5 microns to about 22 microns, and a length of from about 5 mm to about 200 mm, more particularly, the fiber diameter may be from about microns to about 22 microns and the fiber length may be from about 5 mm to about 75 mm.

The exact type of lofting agent used in the prepreg can depend on numerous factors including, for example, the desired lofting temperature, the desired degree of loft, etc. In some instances, microsphere lofting agents which can increase their size upon exposure to convection heating may be used. Illustrative commercially available lofting agents are available, for example, from Kureha Corp. In some instances, the lofting agent is present in microsphere form and may comprise an average particle size of at least 40 microns, for example. In other instances, a first lofting agent with a first average particle size and a second lofting agent with a second average particle size, different from the first average particle size, may be used.

In some configurations, the prepreg may be a substantially halogen free or halogen free prepreg to meet the restrictions on hazardous substances requirements for certain applications. In other instances, the prepreg may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg), more particularly about 1 weight percent to about 13 weight percent, e.g., about 5 weight percent to about 13 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the prepreg), more particularly about 1 weight percent to about 15 weight percent, e.g., about 2 weight percent to about 14 weight percent based on the weight of the prepreg. The flame retardant agents used in the prepregs described herein can be added to the mixture comprising the lofting agent, thermoplastic material and fibers (prior to disposal of the mixture on a wire screen or other processing component) or can be added after the prepreg is formed.

In certain configurations, the articles described herein may comprise a porous core. In certain examples, the porous core comprises one or more thermoplastic materials and a plurality of fibers that can be held in place by the cured thermoplastic material in a web or network structure to provide a plurality of open cells, void space or a web in the core. In some instances, lofting agent can be present in the void space of the porous core in a manner where the lofting agent generally does not covalently bond with the thermoplastic materials and/or the fibers. For example, the thermoplastic materials and/or the fibers can be selected so that they are generally inert or non-reactive with the lofting agent. Even though the lofting agent may not covalently bond to the thermoplastic material and/or the fibers, there typically is covalent bonding present in or within the lofting agent itself. In other instances, it may be desirable to covalently bond the lofting agent to the thermoplastic materials, the fibers or both to provide some covalently bonded lofting agent in the core. Even where bonded lofting agent are present in the core, the lofting agent desirably can still increase their occupied volume under suitable conditions such as, for example, convection heating to permit lofting of the core. In some instances, both covalently bonded lofting agent and non-covalently bonded lofting agent may also be present in the core. While some configurations of the core may comprise lofting agent where about 100% of the lofting agent are non-covalently bonded, weak interactions such as van der Waals' interactions or electrostatic interactions can take place between the lofting agent and the other components of the core, e.g., charge-charge interactions or hydrophobic interactions can take place between the various components present in the core.

In certain configurations, a core can comprise lofting agent dispersed throughout the core. In some instances, the lofting agent dispersion can be substantially homogeneous or substantially uniform from a first surface to a second surface of the core. As described in more detail herein, to achieve such substantially homogeneous or substantially uniform distribution of lofting agent in the core, the components of the core can be mixed together to form a dispersion. Mixing can be performed until the dispersion comprises a substantially homogeneous or substantially uniform mixture of the lofting agent, the thermoplastic materials and the fibers in the dispersion. The core may then be formed as described herein, e.g., by disposing the dispersion on a wire screen using a suitable laying process followed by curing of the thermoplastic material of the core. In other configurations, it may be desirable to provide a gradient distribution of lofting agent from one surface of the core to the other surface of the core. In some configurations, a substantially uniform distribution of lofting agent is present in a core and then additional lofting agent is added to one side of the core to provide a gradient distribution. Such additional lofting agent can be added directly to the core, e.g., by spraying or coating a solution comprising the lofting agent, or can be added by coupling a skin, additional prepreg or core or other component comprising lofting agent to the core. For example, a first core and a second core disposed on the first core can provide a composite article. Each of the cores may comprise a substantially uniform distribution of lofting agent, but the amount and/or type of lofting agent in the two cores can be different, e.g., the loading rates can be different or the materials themselves may be different. If desired, however, only one of the cores may comprise lofting agent and the other core may not comprise a lofting agent or may comprise a different lofting agent. The thermoplastic materials of the cores can be melted to provide a single combined core including materials from the two cores. The result of melting of the cores is a composite core with a gradient distribution of lofting agent. In other configurations, a distribution of lofting agent in a core can be provided by coupling a skin or other material comprising lofting agent to the core. In other instances, the skin can be melted into the core to couple the skin and the core to leave a coupled skin/core composite material without any substantial interface. If desired and as described in more detail below, an additional skin, which may or may not comprise lofting agent can also be coupled to the core on an opposite side from the first skin.

In certain configurations, the thermoplastic material of the core may be used to provide a core in fiber form, particle form, resin form or other suitable forms. In some examples, the thermoplastic material used in the core can be present in particle form and have an average particle size that is substantially the same as the average particle size of the lofting agent. By matching the particles sizes of the thermoplastic material and the lofting agent, enhanced processing of the cores including, for example, increased retention of the lofting agent in the core, an increase in reserved loft capacity, etc. can be achieved. In some instances, the average particle size of the lofting agent and the average particle size of the thermoplastic material can vary by about 5% to about 10% and enhanced processing can still be achieved. In certain configurations, the average particle size of each of the thermoplastic material and the lofting agent in the core can range from about 50 microns to about 900 microns. In other instances, lofting agent with an average particle size about the same as the average particle size of the thermoplastic material can be present along with lofting agent of an average particle size that is different than the average particle size of the thermoplastic material. Even though the average particle size of the lofting agent may differ, the chemical composition of the lofting agent can be the same or can be different. In yet other configurations, two or more thermoplastic materials with different average particle sizes can be present. If desired, two lofting agent with average particle sizes that are substantially the same as the average particle sizes of the two thermoplastic materials can be present in the core. The two lofting agent may be chemically the same or may be chemically distinct. Similarly, the thermoplastic materials can be chemically the same (but have a different average particle size) or can be chemically distinct.

In certain embodiments, the core generally comprises a substantial amount of open cell structure such that void space is present in the core. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 5-30%, 5-40%, 5-50%, 5-60%, 5-70%, 5-80%, 5-90%, 5-95%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% (based on the volume of the core) or any illustrative value within these exemplary ranges. In some instances, the core comprises a porosity or void content of greater than 0%, e.g., is not fully consolidated, up to about 95%. Unless otherwise stated, the reference to the core comprising a certain void content or porosity is based on the total volume of the core and not necessarily the total volume of the core plus any other materials or layers coupled to the core. Compared to a prepreg, the porosity of the core can be the same or can be different. For example, in many instances, a prepreg is formed into a core by passing a prepreg through a set of rollers or by pressing one or both surfaces of the prepreg. In such instances, the porosity of the core may be different than the porosity of the prepreg, e.g., the porosity of the core can be lower than that of the prepreg. In some instances, the porosity of the core is intentionally selected to be less than a comparable prepreg to provide for increased lofting capacity of the core into a final formed article or product.

In certain embodiments, the high porosity present in the core permits trapping of lofting agent within the pores of the core. For example, lofting agent can reside in the void space in a non-covalently bonded manner. Application of heat or other perturbations can act to increase the volume of the non-covalently bonded lofting agent which in turn increases the overall thickness of the core. For example, the lofting agent can be operative as a lofting agent such that application of a suitable stimulus, e.g., convection heat, functions to increase the overall thickness of the core.

In certain embodiments, the thermoplastic material of the cores described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the core can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the core can vary and illustrative amounts range from about 20% by weight to about 80% by weight.

In certain examples, the fibers of the cores described herein can comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, the fibers used in the core can first be reacted with the lofting agent to provide a derivatized fiber that is then mixed with the thermoplastic material. Alternatively, the lofting agent may be reacted with the thermoplastic material of the core to provide a derivatized thermoplastic material that is then mixed with the fibers. The fiber content in the core may be from about 20% to about 90% by weight of the core, more particularly from about 30% to about 70%, by weight of the core. The particular size and/or orientation of the fibers used may depend, at least in part, on the polymer material used and/or the desired properties of the resulting core. Suitable additional types of fibers, fiber sizes and amounts will be readily selected by the person of ordinary skill in the art, given the benefit of this disclosure. In one non-limiting illustration, fibers dispersed within a thermoplastic material and lofting agent to provide a core generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In some instances, the core may be a substantially halogen free or halogen free core to meet the restrictions on hazardous substances requirements for certain applications. In other instances, the core may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the core), more particularly about 1 weight percent to about 13 weight percent, e.g., about 5 weight percent to about 13 weight percent. If desired, two different halogenated flame retardants may be added to the core. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the cores may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the core), more particularly about 1 weight percent to about 13 weight percent, e.g., about 5 weight percent to about 13 weight percent based on the weight of the cores. If desired, two different substantially halogen free flame retardants may be added to the cores. In certain instances, the cores described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the core), more particularly about 1 weight percent to about 15 weight percent, e.g., about 2 weight percent to about 14 weight percent based on the weight of the core. The flame retardant agents used in the cores described herein can be added to the mixture comprising the lofting agent materials, thermoplastic material and fibers (prior to disposal of the mixture on a wire screen or other processing component) or can be added after the prepreg is formed or the core is cured, e.g., by soaking the prepreg or core in the flame retardant agent or spraying flame retardant agent on the prepreg or core.

In certain embodiments, the adhesive layer used in the compositions described herein may comprise a thermoplastic component and a thermosetting material component. Without wishing to be bound by any theory, by including a thermosetting material in an effective amount in the adhesive layer, cross-linking can be enhanced to achieve a better bond between a prepreg or core and a skin layer disposed on the prepreg or core. In some examples, the thermoplastic component of the adhesive layer may comprise a thermoplastic polymer such as, for example, a polyolefin such as a polyethylene or a polypropylene. In other instances, the thermoplastic polymer of the adhesive layer may comprise, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastic polymers for use in the adhesive layer include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermosetting material used can vary and may include one or more thermosetting polymers including, but not limited to, materials comprising one or more epoxy groups, epoxides, epoxy resins, epoxy adhesives, polyesters, polyester resins, thermosetting urethanes, thermosetting polyurethanes, diallylphthalates, polyimides, polyamides, cyanate esters, polycyanurates and combinations thereof. The exact amount ratio of thermoplastic to thermosetting material in the adhesive layer can vary, and in some instances, more thermoplastic material is present (by weight of the adhesive layer) than the amount of thermosetting material that is present. For example, it may be desirable to include less than 10% or 5% thermosetting material by weight of the adhesive layer to still retain the lofting ability of an article comprising a porous core layer. Too much thermosetting material may, for example, deter or limit the lofting capacity of an article by limiting the dimensions in which the article can be lofted. In some embodiments, enough thermosetting material is present in the adhesive layer to enhance peel strength between the core layer and a skin layer, but not so much thermosetting material is present to prevent simultaneous lofting and molding of a composite article using, for example, thermoforming, molding, etc.

Figure 9:
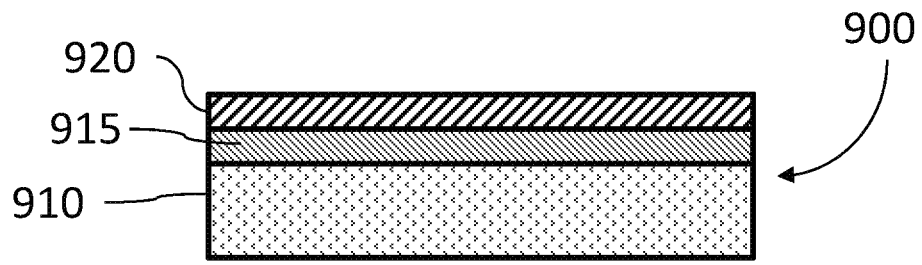
FIG. 9 is an illustration showing a skin layer coupled to a core layer through an adhesive layer, in accordance with certain examples.

In certain embodiments, as noted herein, the composite articles may comprise a skin material disposed on a surface of the prepreg or core to provide an underbody shield composition that can be processed into an underbody shield. Referring to FIG. 9, an article 900 comprises a prepreg or core 910 that comprises a thermoplastic material, a plurality of fibers and lofting agent disposed in the void space of the prepreg or core. The article 900 comprises a first skin 920 disposed on the prepreg or core 910 through an adhesive layer 915 comprising both a thermoplastic polymer component and a thermosetting material. While the exact weight percentages of thermoplastic component and thermosetting material in the adhesive layer of article 900 can vary, the thermoplastic component is typically present at a larger weight percentage than the thermosetting material. The skin 920 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 910. In other instances, the skin 920 may comprise a limiting oxygen index greater than about 22, as measured per ISO 4589 dated 1996. Where a thermoplastic film is present as (or as part of) the skin 920, the thermoplastic film may comprise at least one of poly(etherimide), poly(ether ketone), poly(ether-ether ketone), poly(phenylene sulfide), poly(arylene sulfone), poly(ether sulfone), poly(amideimide), poly(1,4-phenylene), polycarbonate, nylon, and silicone. Where a fiber based scrim is present as (or as part of) the skin 920, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the skin 920, the coating may comprise at least one of unsaturated polyurethanes, vinyl esters, phenolics and epoxies. Where an inorganic coating is present as (or as part of) the skin 920, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 920, the non-woven fabric may comprise a thermoplastic material, a thermal setting binder, inorganic fibers, metal fibers, metallized inorganic fibers and metallized synthetic fibers. The prepreg or core 910 may comprise any of the materials described herein in connection with prepregs and cores, e.g., a thermoplastic material, reinforcing fibers and lofting agents dispersed in the prepreg or core 910. If desired, the skin 920 may also comprise a lofting agent as well.

Figure 10:
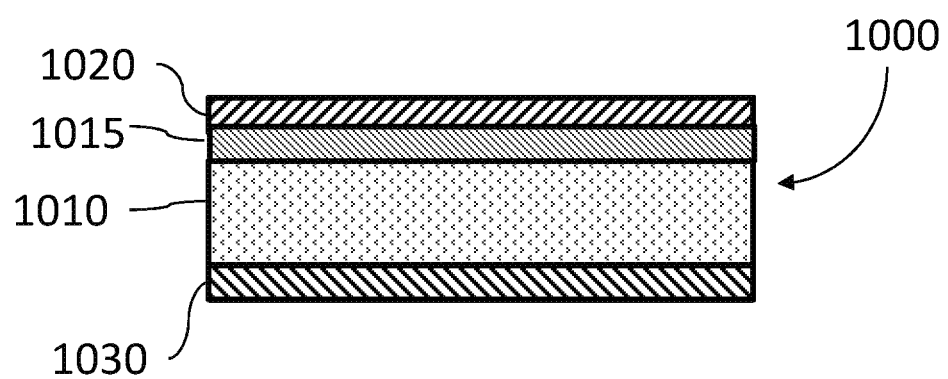
FIG. 10 is an illustration showing a core layer coupled to two skin layers, in accordance with certain embodiments.

In certain configurations, the prepregs and cores described herein can be used to provide an article comprising a skin on each side of the prepreg or core. Referring to FIG. 10, an article 1000 is shown comprising a prepreg or core 1010, a first skin 1020 disposed on a first surface of the prepreg or core 1010 with an adhesive layer 1015 between the core 1010 and the skin 1020. The adhesive layer 1015 comprises a thermoplastic polymer and a thermosetting material to provide an enhanced peel strength between the core 1010 and the skin 1020 after lofting of the core 1010 and/or molding or processing of the article 1000. Also present is a second skin 1030 disposed on the prepreg or core 1010. An optional second adhesive layer (not shown) can be present between the skin 1030 and the core 1010. For example, a second adhesive layer comprising a thermoplastic polymer and a thermosetting material to provide an enhanced peel strength between the core 1010 and the skin 1030 after lofting of the core 1010 and/or molding or processing of the article 1000 can be present. The prepreg or core 1010 may comprise any of the materials described herein in connection with prepregs and cores, e.g., a thermoplastic material, reinforcing fibers and a lofting agent dispersed in the prepreg or core 1010. Each of the first skin 1020 and the second skin 1030 can be independently selected from a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 1010. In other instances, the skin 1020 or the skin 1030 (or both) may comprise a limiting oxygen index greater than about 22, as measured per ISO 4589 dated 1996. Where a thermoplastic film is present as (or as part of) the skin 1020 or the skin 1030 (or both), the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 1020 or the skin 1030 (or both), the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the skin 1020 or the skin 1030 (or both), the coating may comprise at least one of unsaturated polyurethanes, vinyl esters, phenolics and epoxies. Where an inorganic coating is present as (or as part of) the skin 1020 or the skin 1030 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 1020 or the skin 1030 (or both), the non-woven fabric may comprise a thermoplastic material, a thermal setting binder, inorganic fibers, metal fibers, metallized inorganic fibers and metallized synthetic fibers. If desired, one or both of the skins 1020, 1030 may comprise a lofting agent as well.

Figure 11:
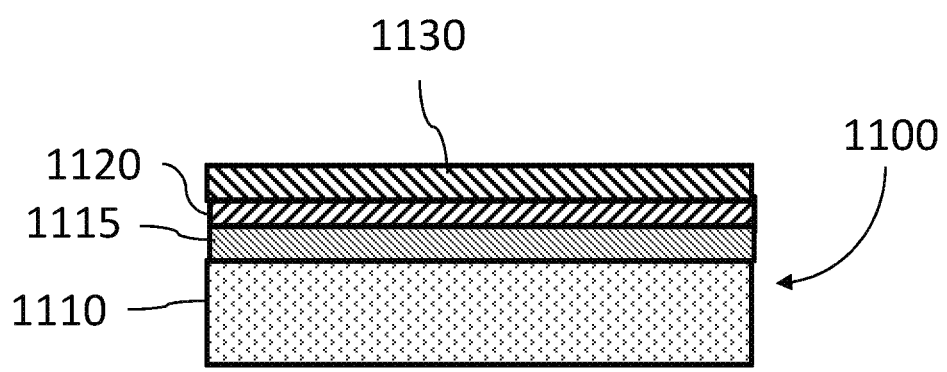
FIG. 11 is an illustration showing a core layer coupled to a skin layer and a decorative layer, in accordance with certain examples.

In certain instances, an article can comprise a prepreg or core, at least one skin disposed on the prepreg or core and a decorative or cover layer disposed on the skin. Referring to FIG. 11, an article 1100 is shown comprising a prepreg or core 1110, a skin 1120 disposed on a first surface of the prepreg or core 1110 and a decorative layer 1130 disposed on the skin 1120. In certain embodiments, an adhesive layer 1115 can be present between the skin 1120 and the core 1110, e.g., an adhesive layer comprising a thermoplastic polymer and a thermosetting material to provide an enhanced post-loft and/or post-mold peel strength between the core 1110 and the skin 1120. In other embodiments, an adhesive layer (not shown) can be present between the skin 1120 and the layer 1130, e.g., an adhesive layer comprising a thermoplastic polymer and a thermosetting material to provide an enhanced post-loft and/or post-mold peel strength between the layer 1130 and the skin 1120. In additional instances, a first adhesive layer with a thermoplastic polymer and a thermosetting material can be present between the core 1110 and the skin 1120, and a second adhesive layer with a thermoplastic polymer and a thermosetting material can be present between the skin 1120 and the layer 1130. The prepreg or core 1110 may comprise any of the materials described herein in connection with prepregs and cores, e.g., a thermoplastic material, reinforcing fibers and a lofting agent dispersed in the prepreg or core 1110. The skin 1120 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 1110. In other instances, the skin 1120 may comprise a limiting oxygen index greater than about 22, as measured per ISO 4589 dated 1996. Where a thermoplastic film is present, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present on or in the skin 1120, the coating may comprise at least one of unsaturated polyurethanes, vinyl esters, phenolics and epoxies. Where an inorganic coating is present, the inorganic coating may comprise minerals containing cations selected from Ca, Mg, Ba, Si, Zn, Ti and Al or may comprise at least one of gypsum, calcium carbonate and mortar. Where a non-woven fabric is present, the non-woven fabric may comprise a thermoplastic material, a thermal setting binder, inorganic fibers, metal fibers, metallized inorganic fibers and metallized synthetic fibers. The decorative layer 1130 may be formed, e.g., from a thermoplastic film of polyvinyl chloride, polyolefins, thermoplastic polyesters, thermoplastic elastomers, or the like. The decorative layer 1130 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 1130 may also be produced using spunbond, thermal bonded, spun lace, melt-blown, wet-laid, and/or dry-laid processes.

Figure 12:
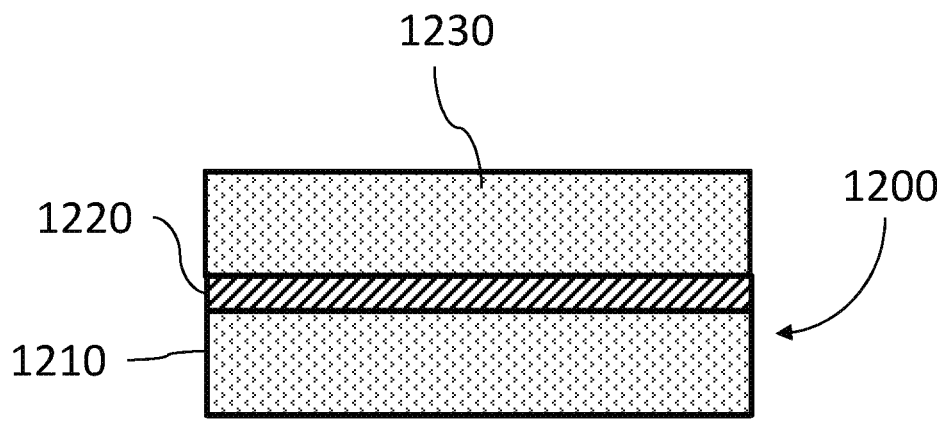
FIG. 12 is an illustration showing two core layers coupled to each other through a layer, in accordance with certain embodiments.

In certain configurations, two or more prepregs or cores can be coupled to each other through an intervening or intermediate layer such as, for example, a skin or an adhesive layer comprising a thermoplastic polymer and a thermosetting material to provide enhanced bonding between the two prepregs or cores. Referring to FIG. 12, an article 1200 comprising a prepreg or core 1210 coupled to a prepreg or core 1230 through an intermediate layer 1220 is shown. Each of the prepregs or cores 1210, 1230 may be the same or may be different. In some instances, the thermoplastic materials and fibers of the prepregs or cores 1210, 1230 are the same, but the lofting agent loading or type of lofting agent material present in the prepregs or cores 1210, 1230 is different. In other instances, the type and/or amount of lofting agent in the prepregs or cores 1210, 1230 may be the same and one or both of the thermoplastic material and/or the fibers may be different, e.g., may be chemically different or may be present in differ amounts. If desired, one or more suitable flame retardant agents, e.g., halogenated or non-halogenated flame retardant agents may be present in one or both of the cores 1210, 1230. While the thickness of the prepregs or cores 1210, 1230 is shown as being about the same in FIG. 12, the thickness of the prepregs or cores 1210, 1230 can vary. In some configurations, one of the prepregs or cores 1210, 1230 may comprise a lofting agent comprising microspheres. Where microspheres are used as a lofting agent in one or both of the cores 1210, 1230, the microspheres may be present in combination with another lofting agent. The intermediate layer 1220 may take the form of a skin as described herein or an adhesive layer as described herein, e.g., one comprising a thermoplastic polymer and a thermosetting material to provide an enhanced peel strength between the two prepregs or cores 1210, 1230. Where the intermediate layer 1220 takes the form of a skin, an additional layer, e.g., an adhesive layer comprising a thermoplastic polymer and a thermosetting material to provide an enhanced peel strength, may also be present. Where the layer 1220 takes the form of a skin, the skin may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 1210. In other instances, the layer 1220 may comprise a limiting oxygen index greater than about 22, as measured per ISO 4589 dated 1996. Where a thermoplastic film is present, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the layer 1220, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the layer 1220, the coating may comprise at least one of unsaturated polyurethanes, vinyl esters, phenolics and epoxies. Where an inorganic coating is present as or in the layer 1220, the inorganic coating may comprise minerals containing cations selected from Ca, Mg, Ba, Si, Zn, Ti and Al or may comprise at least one of gypsum, calcium carbonate and mortar. Where a non-woven fabric is present as or in the layer 1220, the non-woven fabric may comprise a thermoplastic material, a thermal setting binder, inorganic fibers, metal fibers, metallized inorganic fibers and metallized synthetic fibers. While not shown, a decorative layer can be coupled to either (or both) of the prepregs or cores 1210, 1230. As noted herein, the decorative layer may be formed, for example, from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 13:
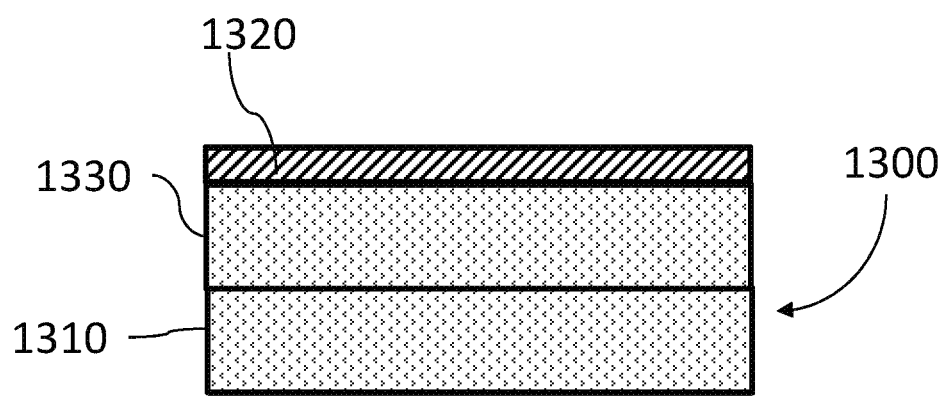
FIG. 13 is an illustration showing two core layers coupled to each other and a skin layer disposed on one of the core layers, in accordance with certain embodiments.

In certain embodiments, two or more prepregs or cores can be coupled to each other and then a skin may be disposed on one surface of the prepregs or cores. Referring to FIG. 13, an article 1300 comprising a prepreg or core 1310 coupled to a prepreg or core 1330 and a skin 1320 disposed on the core 1330 is shown. Each of the prepregs or cores 1310, 1330 may be the same or may be different. In some instances, the thermoplastic materials and fibers of the cores 1310, 1330 are the same, but the lofting agent material loading or type of lofting agent material present in the cores 1310, 1330 is different. In other instances, the type and/or amount of lofting agent in the cores 1310, 1330 may be the same and one or both of the thermoplastic material and/or the fibers may be different, e.g., may be chemically different or may be present in differ amounts. If desired, one or more suitable flame retardant agents, e.g., halogenated or non-halogenated flame retardant agents may be present in one or both of the prepregs or cores 1310, 1330. While the thickness of the prepregs or cores 1310, 1330 is shown as being about the same in FIG. 13, the thickness of the prepregs or cores 1310, 1330 can vary. In some configurations, one of the prepregs or cores 1310, 1330 may comprise a lofting agent comprising microspheres. In some instances, an adhesive layer may be present between the skin 1320 and the core 1330, e.g., an adhesive comprising a thermoplastic polymer and a thermosetting material to provide an enhanced peel strength between the skin 1320 and the core 1330 may be present. In some instances, the skin 1320 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 1330. In other instances, the skin 1320 may comprise a limiting oxygen index greater than about 22, as measured per ISO 4589 dated 1996. Where a thermoplastic film is present as or in the skin 1320, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 1320, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the skin 1320, the coating may comprise at least one of unsaturated polyurethanes, vinyl esters, phenolics and epoxies. Where an inorganic coating is present as or in the skin 1320, the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 1320, the non-woven fabric may comprise a thermoplastic material, a thermal setting binder, inorganic fibers, metal fibers, metallized inorganic fibers and metallized synthetic fibers. While not shown, a decorative layer can be coupled to the skin 1320 or to a surface of the prepreg or core 1310. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. If desired, one or more adhesive layers can be present between the cores 1310, 1330 and/or the core 1330 and the skin 1320. For example, an adhesive layer comprising a thermoplastic polymer and a thermosetting material to provide a peel strength (between two components coupled through the adhesive layer) of at least 0.5 N/cm (in either or both of the machine direction or the cross direction) as tested by DIN 53357 A can be present. In some instances, a first adhesive layer can be present between the cores 1310, 1330 and a second adhesive layer (which may be the same or may be different from the first adhesive layer) may be present between the core 1330 and the skin 1320.

Figure 14:
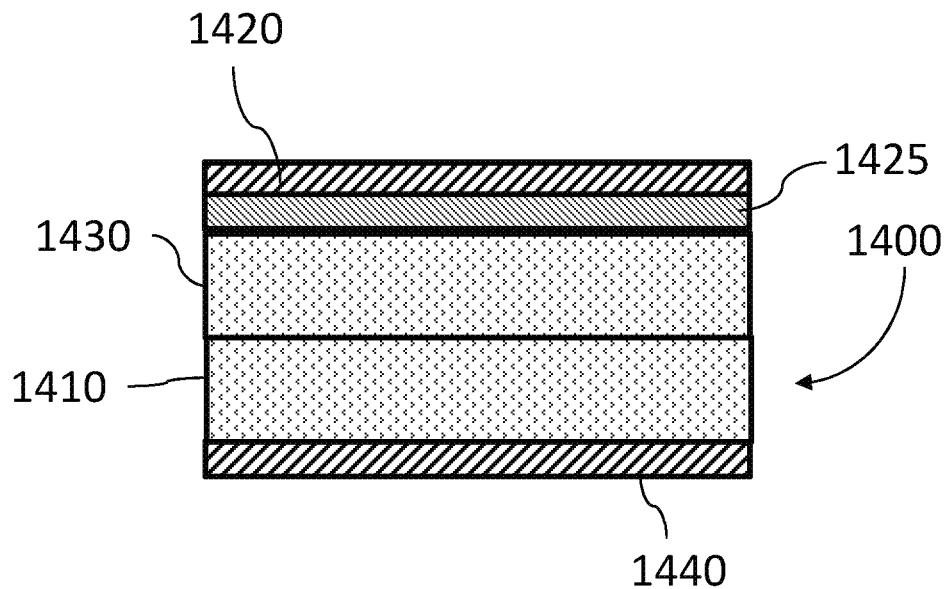
FIG. 14 is an illustration showing two core layers coupled to each other and a skin layer disposed on each of the core layers, in accordance with certain embodiments.

In certain embodiments, two or more prepregs or cores can be coupled to each other and then a skin may be disposed on each surface of the prepregs or cores. Referring to FIG. 14, an article 1400 comprising a prepreg or core 1410 coupled to a prepreg or core 1430, a first skin 1420 disposed on the core 1430, and a second skin 1440 disposed on the core 1410 is shown. In some embodiments, an adhesive layer 1425 comprising a thermoplastic polymer and a thermosetting material can be present between the skin 1420 and the core 1430, e.g., an adhesive layer comprising a thermoplastic polymer and a thermosetting material to provide a post-loft peel strength between the core 1430 and the skin 1420 of at least 0.5 N/cm (in either or both of the machine direction or the cross direction) as tested by DIN 53357 A may be present. If desired, an adhesive layer (not shown) can be present between the skin 1440 and the core 1410, e.g., an adhesive layer comprising a thermoplastic polymer and a thermosetting material to provide a post-loft peel strength between the core 1410 and the skin 1440 of at least 0.5 N/cm (in either or both of the machine direction or the cross direction) as tested by DIN 53357 A may be present. Each of the prepregs or cores 1410, 1430 may be the same or may be different. In some instances, the thermoplastic materials and fibers of the prepregs or cores 1410, 1430 are the same, but the lofting agent material loading or type of lofting agent material present in the prepregs or cores 1410, 1430 is different. If desired, one or more suitable flame retardant agents, e.g., halogenated or non-halogenated flame retardant agents may be present in one or both of the prepregs or cores 1410, 1430. While the thickness of the prepregs or cores 1410, 1430 is shown as being about the same in FIG. 14, the thickness of the prepregs or cores 1410, 1430 can vary. In some configurations, one of the prepregs or cores 1410, 1430 may comprise a different lofting agent. Each of the skins 1420, 1440 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core. In other instances, the skins 1420, 1440 may independently comprise a limiting oxygen index greater than about 22, as measured per ISO 4589 dated 1996. Where a thermoplastic film is present as or in the skin 1420 or the skin 1440 (or both), the thermoplastic film may comprise at least one of poly(ether imide), poly(ether ketone), poly (ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 1420 or the skin 1440 (or both), the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the skin 1420 or the skin 1440 (or both), the coating may comprise at least one of unsaturated polyurethanes, vinyl esters, phenolics and epoxies. Where an inorganic coating is present as or in the skin 1420 or the skin 1440 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 1420 or the skin 1440 (or both), the non-woven fabric may comprise a thermoplastic material, a thermal setting binder, inorganic fibers, metal fibers, metallized inorganic fibers and metallized synthetic fibers. While not shown, a decorative layer can be coupled to the skin 1420 or to the skin 1440 (or both). As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric or other material may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 15:
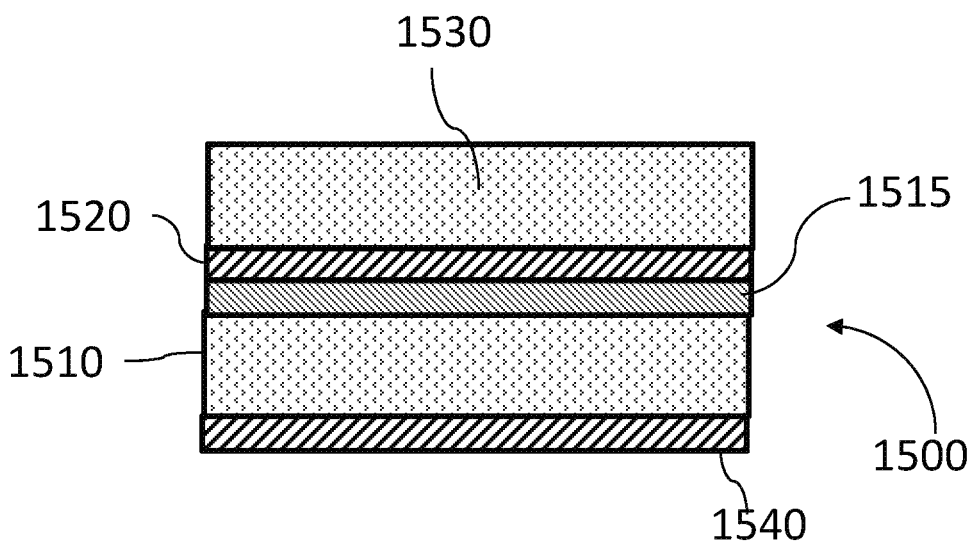
FIG. 15 is an illustration showing two core layers coupled to each other with intervening layers between the core layers, in accordance with certain embodiments.

In certain embodiments, two or more prepregs or cores can be coupled to each other and then a skin may be disposed on each surface of the prepregs or cores. Referring to FIG. 15, an article 1500 comprising a prepreg or core 1510 coupled to a prepreg or core 1530 through an intermediate layer 1520, and a skin 1540 disposed on the core 1540 is shown. If desired, the skin 1540 can instead be disposed on the prepreg or core 1530 or another skin (not shown) can be disposed on the prepreg or core 1520. Each of the prepregs or cores 1510, 1530 may be the same or may be different. In some instances, the thermoplastic materials and fibers of the prepregs or cores 1510, 1530 are the same, but the lofting agent material loading or type of lofting agent present in the prepregs or cores 1510, 1530 is different. In other instances, the type and/or amount of lofting agent in the prepregs or cores 1510, 1530 may be the same and one or both of the thermoplastic material and/or the fibers may be different, e.g., may be chemically different or may be present in differ amounts. In some configurations, the intermediate layer 1515 can be an adhesive layer comprising a thermoplastic polymer and a thermosetting material to provide a post-loft peel strength between the core 1510 and the skin 1520 of at least 0.5 N/cm (in either or both of the machine direction or the cross direction) as tested by DIN 53357 A may be present. In other instances, an adhesive layer (not shown) can be present between the skin 1520 and the core 1530, e.g., an adhesive layer comprising a thermoplastic polymer and a thermosetting material to provide a post-loft peel strength between the core 1530 and the skin 1520 of at least 0.5 N/cm (in either or both of the machine direction or the cross direction) as tested by DIN 53357 A may be present. If desired, one or more suitable flame retardant agents, e.g., halogenated or non-halogenated flame retardant agents may be present in one or both of the prepregs or cores 1510, 1530. While the thickness of the prepregs or cores 1510, 1530 is shown as being about the same in FIG. 15, the thickness of the prepregs or cores 1510, 1530 can vary. In some configurations, one or both of the prepregs or cores 1510, 1530 may comprise a lofting agent comprising microspheres. The microspheres may be present in combination with another lofting agent if desired. The skin 1520 and the skin 1540 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 1510. In other instances, the skin 1520 and the skin 1540 may independently comprise a limiting oxygen index greater than about 22, as measured per ISO 4589 dated 1996. Where a thermoplastic film is present as or in the skin 1520 or the skin 940 (or both), the thermoplastic film may comprise at least one of poly(ether imide), poly(ether ketone), poly (ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 1520 or the skin 1540 (or both), the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the layer 1520 or the skin 1540 (or both), the coating may comprise at least one of unsaturated polyurethanes, vinyl esters, phenolics and epoxies. Where an inorganic coating is present as or in the skin 1520 or the skin 1540 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 1520 or the skin 1540 (or both), the non-woven fabric may comprise a thermoplastic material, a thermal setting binder, inorganic fibers, metal fibers, metallized inorganic fibers and metallized synthetic fibers. While not shown, a decorative layer can be coupled to the skin 1540 or the prepreg or core 1530 (or both). As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. In some instances, a second adhesive layer (which may be the same or may be different from any adhesive in layer 1515) can be present between the core 1510 and the skin 1540, e.g., a second adhesive layer comprising a thermoplastic polymer and a thermosetting material to provide a post-loft peel strength between the core 1510 and the skin 1540 of at least 0.5 N/cm (in either or both of the machine direction or the cross direction) as tested by DIN 53357 A may be present.

In some embodiments, the prepregs and cores may include additional materials or additives to impart desired physical or chemical properties. For example, one or more dyes, texturizing agents, colorants, viscosity modifiers, smoke suppressants, synergistic materials, lofting agents, particles, powders, biocidal agents, foams or other materials can be mixed with or added to the prepregs or the cores. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. If desired, a synergist material that enhances lofting ability may be present. Illustrative synergist materials include, but are not limited to, sodium trichlorobenzene sulfonate potassium, diphenyl sulfone-3-sulfonate, and mixtures thereof.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein can be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® mat. SUPERLITE® mat loaded with lofting agent can provide desirable attributed including, for example, flame retardancy and enhanced processing capabilities. The areal density of such a GMT or LWRT can range from about 400 grams per square meter (gsm) of the GMT or LWRT to about 4000 gsm, although the areal density may be less than 400 gsm or greater than 4000 gsm depending on the specific application needs. In some embodiments, the upper density can be less than about 4000 gsm. In certain instances, the GMT or the LWRT may comprise lofting agent material disposed in void space of the GMT or the LWRT. For example, non-covalently bonded lofting agent can be present in void space of the GMT or the LWRT. In other instances, covalently-bonded lofting agent can be present in void space of the GMT or the LWRT. In yet other configurations, both non-covalently bonded lofting agent and covalently bonded lofting agent can be present in the GMT or the LWRT. In certain configurations where a GMT or LWRT prepreg or core is used in combination with lofting agent, the basis weight of the GMT or LWRT can be reduced to less than 800 gsm, 600 gsm or 400 gsm, for example, while still providing suitable performance properties, e.g., suitable peel strength between the LWRT and any skin disposed thereon. If desired, an additional lofting agent, e.g., microspheres can be present in the GMT or LWRT.

In producing the prepregs and cores described herein, it may be desirable to use a wet-laid process. For example, a liquid or fluid medium comprising dispersed material, e.g., thermoplastic materials, fibers and lofting agent material optionally with any one or more additives described herein (e.g., other lofting agents or flame retardant agents), may be stirred or agitated in the presence of a gas, e.g., air or other gas. The dispersion may then be laid onto a support, e.g., a wire screen or other support material. The stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, lofting agent and any other materials that are present, e.g., fibers, additives, etc. The resulting web can be dried, consolidated, pressed, lofted, laminated, sized or otherwise processed further to provide a desired prepreg, core or article. In some instances, an additive or additional lofting agent material can be added to the web prior to drying, consolidation, pressing, lofting, laminating, sizing or other further processing to provide a desired prepreg, core or article. In other instances, the lofting agent may be added to the web subsequent to drying, consolidation, pressing, lofting, laminating, sizing or other further processing to provide a desired prepreg, core or article. While wet laid processes may be used, depending on the nature of the thermoplastic material, the lofting agent material and other materials present, it may be desirable to instead use an air laid process, a dry blend process, a carding and needle process, or other known process that are employed for making non-woven products. In some instances, additional lofting agent material can be sprayed onto the surface of the prepreg or core after the prepreg or core has hardened to some degree by passing the board underneath a plurality of coating jets that are configured to spray the lofting agent material at about a ninety degree angle to the prepreg or core surface.

In some instances, an adhesive layer, e.g., one comprising a thermoplastic polymer and a thermosetting material, can then be sprayed on, rolled on, coated on or otherwise disposed on the formed web. If desired, the web can be heated prior to disposal of the adhesive layer, can be cooled prior to disposal of the adhesive layer or remain at ambient temperature during disposal of the adhesive layer. In some instances, the web can be heated to soften an outer surface of the web prior to disposal of the adhesive layer.

In some configurations, the prepregs and cores described herein can be produced by combining a thermoplastic material, fibers, and microsphere lofting agent in the presence of a surfactant in an aqueous solution or foam. The combined components can be mixed or agitated for a sufficient time to disperse the various materials and provide a substantially homogeneous aqueous mixture of the materials. The dispersed mixture is then laid down on any suitable support structure, for example, a wire mesh or other mesh or support having a desired porosity. Water can then be evacuated through the wire mesh forming a web. The web is dried and heated above the softening temperature of the thermoplastic powder. The web is then cooled and pressed to a predetermined thickness to produce a composite sheet having a void content of between about 1 percent to about 95 percent. In an alternate embodiment, the aqueous foam also includes a binder material. In some configurations, after the web is heated above the softening temperature of the thermoplastic powder, an adhesive layer comprising a thermoplastic polymer and a thermosetting material can then be disposed on the web.

In certain examples, a prepreg or core in the form of a GMT can be produced. In certain instances, the GMT can be generally prepared using chopped glass fibers, a thermoplastic material, lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the glass mat, a thermoplastic material, reinforcing materials, lofting agent and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of glass and resin can be pumped to a head-box located above a wire section of a paper machine via a distribution manifold. The foam, not the glass fiber, lofting agent or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, an adhesive layer comprising a thermoplastic polymer and a thermosetting material may be laid onto the web by passing the web of glass fiber, lofting agent, thermoplastic material and film through the nip of a set of heated rollers followed by spraying of the adhesive onto the surface of the web. If desired, additional layers such as, for example, a non-woven and/or woven fabric layer or skin layer may also be attached to one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In some instances, a prepreg, core or article can be produced by combining a thermoplastic material, reinforcing fibers and lofting agent in a mixture to form an agitated aqueous foam. The agitated aqueous foam can be disposed onto a wire support. Water can be evacuated to form a web or open cell structure. The web can be heated, e.g., using convection heating, above the melting temperature of the thermoplastic material under conditions such that substantially no loft occurs. If desired, pressure can be applied to the web to provide a thermoplastic composite sheet comprising the lofting agent. The sheet can be further processed by selecting suitable heating conditions to provide a desired loft. Prior to disposal of a skin layer, an adhesive layer can be disposed on the sheet, e.g., an adhesive layer comprising a thermoplastic polymer and a thermosetting material can be disposed on the sheet to provide a post-molded and post-loft peel strength between the sheet and disposed skin of at least 0.5 N/cm (in either or both of the machine direction or the cross direction) as tested by DIN 53357 A. A skin or cover layer can then be disposed on the adhesive layer. In some instances, heating conditions that are effective to loft the sheet can be applied to increase the overall board thickness. For example, the multi-layer assembly can be placed in a mold and heating conditions can be applied to loft the sheet to press the surfaces of the sheet against the other layers of the assembly while still providing a desired peel strength. In other instances, one or more areas of the multi-layer assembly can be drawn to a desired depth to form structures with a selected geometry and/or dimensions.

In certain instances, a method of producing a composite article comprises combining a thermoplastic material, reinforcing fibers and a lofting agent in a mixture to form an agitated aqueous foam. The foam is disposed onto a wire support, and the water is evacuated to form a web or open cell structure comprising the thermoplastic material, fibers and lofting agent materials. In some instances, the web is then heated to a first temperature above the melting temperature of the thermoplastic material, in which the first temperature is below a loft onset temperature of the lofting agent so substantially no loft occurs. In other instances, the web can be heating using heating conditions that melt the thermoplastic material, e.g., convection heating, but do not substantially loft the lofting agent. If desired, pressure can then be applied to the web, e.g., using nip rollers or other devices, to provide a thermoplastic composite sheet comprising the lofting agent dispersed in the web.

Certain examples are described below to illustrate better some of the novel aspects and configurations described herein.

Example 1

A series of tests were performed to measure peel strength between a LWRT core and PET scrims disposed on the core. The LWRT core included the following materials: glass fibers/polymer resin (40-50 weight percent glass fiber and 50-60 weight percent polypropylene) and an optional lofting agent (2-10 weight percent microspheres). An adhesive layer comprising thermoplastic (such as polyethylene or polypropylene) was disposed between the PET scrim and the core (for the Condako scrim samples in the table in FIG. 16), and an adhesive layer comprising thermoplastic and thermoset mixture (epoxy adhesive mixed with a thermoplastic such as polyethylene or polypropylene) was disposed between the PET scrim and the core (for the Tenowo and Fibertex scrim samples shown in FIG. 16). The peel strength was measured from both the top side and the bottom side using DIN 53357 A dated Oct. 1, 1082. The total thickness after molding for each tested sample was about 20 mm. The basis weight of the LWRT core was 1000 gsm, the basis weight of the PET scrim was 80 gsm, and the basis weight of the adhesive layer (for each of a thermoplastic adhesive layer and a thermoplastic/thermoset mixture adhesive layer) was 20 gsm.

For the Condako scrim samples (which lacked any thermosetting material in the adhesive layer), the peel strength values from the top side did not exceed 0.30 N/cm (machine direction—MD) and 0.20 N/cm (cross direction—CD). In comparison, the use of a thermosetting material in the adhesive layer results in a maximum peel strength (MD) of 0.62 N/cm and 0.42 N/cm (CD) for the Tenowo scrim, and 0.59 N/cm (MD) and 0.82 (CD) for the Fibertex scrim.

For the bottom side peel strength, the Condako samples provided maximum values of 0.87 N/cm (MD) and 0.47 N/cm (CD). The Tenowo samples provided maximum values of 2.10 N/cm (MD) and 3.00 N/cm (CD), and the Fibertex samples provided maximum values of 2.60 N/cm (MD) and 2.00 (CD). These results are consistent with the presence of a thermosetting material in the adhesive layer increasing the peel strength between the skin layer and the core layer while still permitting lofting of the core layer.

The average peel strength values for the measurements are shown in the table in FIG. 17. As noted, there can be almost a 400% increase in peel strength by including the thermoplastic/thermoset adhesive layer between the scrim and the core layer.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of forming a composite article comprising:
combining a thermoplastic polymer, reinforcing fibers and a lofting agent in an aqueous solution;
mixing the aqueous solution comprising the thermoplastic polymer, the reinforcing fibers and the lofting agent to disperse the reinforcing fibers and the lofting agent in the thermoplastic polymer to provide an aqueous foam dispersion;
disposing the aqueous foam dispersion onto a forming element;
removing liquid from the disposed aqueous foam to provide a core layer comprising a web formed from the thermoplastic polymer, the reinforcing fibers and the lofting agent;
heating the core layer above a softening temperature of the thermoplastic polymer of the core layer;
disposing an adhesive layer comprising a thermoplastic polymer and a thermosetting material on the core layer;
disposing a skin material on the disposed adhesive layer to provide the composite article; and
lofting the core layer of the composite article using heat to increase a thickness of the core layer and provide a peel strength between the disposed skin material and the lofted core layer of at least 0.5 N/cm as tested by DIN 53357 A dated Oct. 1, 1982.

2. The method of claim 1, further comprising compressing the composite article to a predetermined thickness prior to lofting of the core layer.

3. The method of claim 1, further comprising crosslinking the thermosetting material of the adhesive layer.

4. The method of claim 1, further comprising disposing the adhesive layer by co-spraying the thermoplastic polymer of the adhesive layer and the thermosetting material of the adhesive layer onto the heated core layer.

5. The method of claim 4, further comprising crosslinking the thermosetting material of the co-sprayed adhesive layer.

6. The method of claim 1, further comprising blending the thermoplastic polymer of the adhesive layer and the thermosetting material of the adhesive layer prior to disposing the adhesive layer on the core layer.

7. The method of claim 6, further comprising crosslinking the disposed adhesive layer comprising the adhesive blend.

8. The method of claim 6, further comprising rolling the adhesive blend onto the core layer to provide the adhesive layer.

9. The method of claim 8, further comprising crosslinking the adhesive blend of the rolled adhesive layer.

10. The method of claim 1, further comprising disposing a second adhesive layer on a second surface of the core layer, and disposing a second skin material on the disposed second adhesive layer.

11. A method of forming a composite article comprising:
combining a thermoplastic polymer, reinforcing fibers and a lofting agent in an aqueous solution;
mixing the aqueous solution comprising the thermoplastic polymer, the reinforcing fibers and the lofting agent to disperse the reinforcing fibers and the lofting agent in the thermoplastic polymer to provide an aqueous foam dispersion;
disposing the aqueous foam dispersion onto a forming element;
removing liquid from the disposed aqueous foam to provide a web comprising the thermoplastic polymer, the reinforcing fibers and the lofting agent;
heating the web above a softening temperature of the thermoplastic polymer of the web;
disposing an adhesive layer comprising a thermoplastic polymer and a thermosetting material on a first surface of the heated web; and
disposing a scrim on the disposed adhesive layer to provide the composite article.

12. The method of claim 11, further comprising compressing the composite article to a predetermined thickness.

13. The method of claim 12, further comprising lofting the compressed composite article to increase the thickness of the composite article.

14. The method of claim 13, further comprising crosslinking the thermosetting material of the adhesive layer to provide a peel strength for the scrim of the lofted composite article of at least 0.5N/cm as tested by DIN 53357 A dated Oct. 1, 1982.

15. The method of claim 11, further comprising disposing the adhesive layer by co-spraying the thermoplastic polymer of the adhesive layer and the thermosetting material of the adhesive layer onto the heated web.

16. The method of claim 15, further comprising crosslinking the thermosetting material of the co-sprayed adhesive layer to provide a peel strength for the scrim of the lofted composite article of at least 0.5 N/cm as tested by DIN 53357 A dated Oct. 1, 1982.

17. The method of claim 11, further comprising blending the thermoplastic polymer of the adhesive layer and the thermosetting material of the adhesive layer prior to disposing the adhesive layer on the heated web.

18. The method of claim 17, further comprising crosslinking the disposed adhesive layer comprising the adhesive blend to provide a peel strength for the scrim of the lofted composite article of at least 0.5 N/cm as tested by DIN 53357 A dated Oct. 1, 1982.

19. The method of claim 17, further comprising rolling the adhesive blend onto the heated web to provide the adhesive layer.

20. The method of claim 19, further comprising crosslinking the rolled, adhesive blend to provide a peel strength for the scrim of the lofted composite article of at least 0.5 N/cm as tested by DIN 53357 A dated Oct. 1, 1982.

\* \* \* \* \*